United States Patent
Icho et al.

(10) Patent No.: US 9,058,101 B2
(45) Date of Patent: Jun. 16, 2015

(54) DISPLAY CONTROL DEVICE AND DISPLAY CONTROL METHOD

(75) Inventors: Keiji Icho, Osaka (JP); Yuichi Kobayakawa, Osaka (JP); Ryuji Inoue, Osaka (JP); Ryouichi Kawanishi, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 110 days.

(21) Appl. No.: 13/818,852

(22) PCT Filed: Jul. 18, 2012

(86) PCT No.: PCT/JP2012/004576
§ 371 (c)(1),
(2), (4) Date: Feb. 25, 2013

(87) PCT Pub. No.: WO2013/018299
PCT Pub. Date: Feb. 7, 2013

(65) Prior Publication Data
US 2013/0159921 A1    Jun. 20, 2013

(30) Foreign Application Priority Data

Aug. 4, 2011    (JP) .................................. 2011-171361

(51) Int. Cl.
*G06F 3/0488* (2013.01)
*G06F 3/0485* (2013.01)

(52) U.S. Cl.
CPC .......... *G06F 3/04883* (2013.01); *G06F 3/0485* (2013.01); *G06F 2203/04803* (2013.01); *G06F 2203/04808* (2013.01)

(58) Field of Classification Search
USPC ......... 715/784, 786, 787, 771, 734, 785, 830; 345/157, 159, 684
See application file for complete search history.

(56) References Cited

U.S. PATENT DOCUMENTS 5,506,951 A * 4/1996 Ishikawa ........................ 715/786
6,169,540 B1 * 1/2001 Rosenberg et al. ............ 715/701
(Continued)

FOREIGN PATENT DOCUMENTS

JP    63-206827    8/1988
JP    3593827    11/2004
(Continued)

OTHER PUBLICATIONS

International Search Report issued Oct. 23, 2012 in International (PCT) Application No. PCT/JP2012/004576.

*Primary Examiner* — Doon Chow
*Assistant Examiner* — Wendy Nicholas
(74) *Attorney, Agent, or Firm* — Wenderoth, Lind & Ponack, L.L.P.

(57) ABSTRACT

A display control device includes a first-contents-list displaying unit which displays a first contents list on a display screen, a base-point-content identifying unit which identifies a base-point content on the first contents list, a base-point-content-position obtaining unit which obtains a first base-point-content position on the first contents list, a focus position obtaining unit which obtains a focus position on the first contents list, a positional difference calculating unit which calculates a positional difference between the first base-point-content position and the focus position, and a first scrolling unit which scrolls the first contents list displayed on the display screen so that the positional difference decreases.

14 Claims, 26 Drawing Sheets

(56) References Cited

U.S. PATENT DOCUMENTS

| | | | |
|---|---|---|---|
| 6,677,965 B1* | 1/2004 | Ullmann et al. | 715/786 |
| 7,958,456 B2 | 6/2011 | Ording et al. | |
| 8,171,422 B2* | 5/2012 | Sauermann | 715/784 |
| 8,209,614 B2 | 6/2012 | Ishihara et al. | |
| 2003/0043174 A1* | 3/2003 | Hinckley et al. | 345/684 |
| 2005/0078940 A1* | 4/2005 | Wakita et al. | 386/52 |
| 2005/0091604 A1* | 4/2005 | Davis | 715/772 |
| 2006/0136838 A1* | 6/2006 | Nurmi | 715/786 |
| 2007/0132789 A1* | 6/2007 | Ording et al. | 345/684 |
| 2007/0150830 A1 | 6/2007 | Ording et al. | |
| 2008/0052636 A1 | 2/2008 | Abe et al. | |
| 2008/0155461 A1* | 6/2008 | Ozaki | 715/784 |
| 2009/0049400 A1 | 2/2009 | Ishihara et al. | |
| 2011/0022985 A1 | 1/2011 | Ording et al. | |
| 2011/0055752 A1* | 3/2011 | Rubinstein et al. | 715/784 |
| 2011/0099509 A1 | 4/2011 | Horagai | |
| 2012/0139952 A1* | 6/2012 | Imai et al. | 345/672 |
| 2012/0198384 A1* | 8/2012 | Kumamoto | 715/786 |
| 2012/0221969 A1* | 8/2012 | Sansen et al. | 715/784 |
| 2012/0266083 A1 | 10/2012 | Ishihara et al. | |

FOREIGN PATENT DOCUMENTS

| | | |
|---|---|---|
| JP | 2007-140004 | 6/2007 |
| JP | 2008-052621 | 3/2008 |
| JP | 2009-048310 | 3/2009 |
| JP | 2009-518758 | 5/2009 |
| JP | 2011-095932 | 5/2011 |
| WO | 2007/067858 | 6/2007 |

* cited by examiner

DISPLAY CONTROL DEVICE AND DISPLAY CONTROL METHOD

BACKGROUND OF INVENTION

1. Technical Field

The present invention relates to a display control device and a display control method enabling scroll control that facilitates a search for a content.

2. Background Art

The capacities of recording media have increased in these years, and along with this increase has come an increase in opportunities for users to search for contents such as photographs, moving images and music contents.

A typical way of searching contents is scrolling. A number of methods for controlling scroll for display have been proposed. For example, a method of using a touch panel to scroll contents to allow the way a contents list is displayed to be adjusted according to the scroll operation (see Patent Literature 1). Another method has been proposed in which thumbnails of contents are displayed along two axes that have different resolutions of scrolling and the thumbnails along the two axes are scrolled together (see Patent Literature 2).

CITATION LIST

Patent Literature

[Patent Literature 1] Japanese National Phase PCT Laid-Open Publication No. 2009-518758
[Patent Literature 2] Japanese Unexamined Patent Application Publication No. 2008-52621

SUMMARY OF INVENTION

However, with the conventional techniques, it can be difficult for a user to search for a desired content by scrolling a contents list in some situations, in which case the user performs many operations, which can result in a heavy load on the device or a significant increase in power consumption.

The present invention solves the problem with the conventional techniques and an object of the present invention is to provide a display control device and a display control method that are capable of controlling a scroll operation on a contents list to make it easier for a user to search for a content when the user performs the scroll operation on the contents list.

To solve the above problems, a display control device according to an embodiment of the present invention includes a first-contents-list displaying unit configured to display on a display screen a first contents list which is a scrollable list of contents; a base-point-content identifying unit configured to identify a base-point content on the first contents list; a base-point-content-position obtaining unit configured to obtain a first base-point-content position which is a position of the base-point content on the first contents list; a focus position obtaining unit configured to obtain a focus position which is a position on the first contents list and is related to a predetermined region on the first contents list displayed on the display screen; a positional difference calculating unit configured to calculate a positional difference between the obtained first base-point-content position and the obtained focus position; and a first scrolling unit configured to scroll the first contents list displayed on the display screen so that the positional difference decreases.

These general and specific aspects may be implemented using a system, a method, an integrated circuit, a computer program, or a computer-readable recording medium such as a CD-ROM, or any combination of devices, systems, methods, integrated circuits, computer programs, or computer-readable recording media.

According to the present invention, a scroll operation on a contents list can be controlled to make it easier for a user to search for a content when the user searches for the content on the contents list. This can inhibit the user from performing many operations to cause a heavy load on a device or a significant increase in power consumption.

Figure 1:
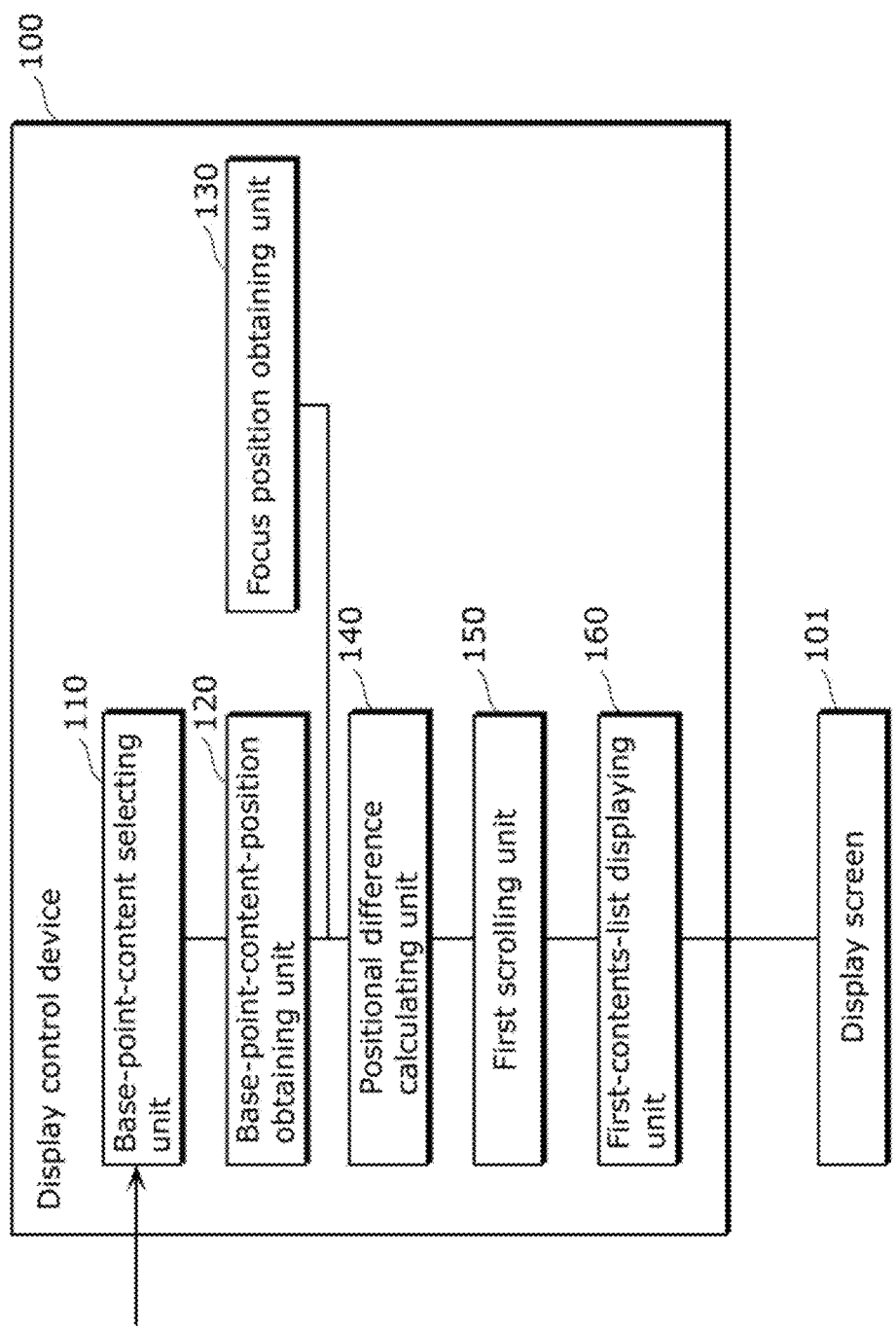
FIG. 1 is a block diagram illustrating a functional configuration of a display control device in a first embodiment of the present invention.

DETAILED DESCRIPTION OF INVENTION (Underlying Knowledge Forming Basis of the Present Disclosure)

The present inventor has found the following problems with the conventional method's described in the section "Background Art".

With the conventional techniques described above, when a user performing a scrolling operation on a contents list checks a content succeeding or preceding a content selected by the user or searches for a next content to select on the basis of the content selected, the user cannot perform a scroll operation while holding the selected content. Consequently, a load is placed on the user such that the user has to search for the selected content again. There is another problem that when the user selects a content or performs a scroll operation on a contents list of multiple contents selected from among multiple contents obtained by photographing, the user cannot know which position a focus content on the contents list is in on a contents list of original contents obtained by photographing.

Consequently, when the user performs a scroll operation on the contents list, the user may perform many operations to impose a heavy load on the device and significantly increase power consumption.

To solve the above problems, a display control device according to an embodiment of the present invention includes a first-contents-list displaying unit configured to display on a display screen a first contents list which is a scrollable list of contents; a base-point-content identifying unit configured to identify a base-point content on the first contents list; a base-point-content-position obtaining unit configured to obtain a first base-point-content position which is a position of the base-point content on the first contents list; a focus position obtaining unit configured to obtain a focus position which is a position on the first contents list and is related to a predetermined region on the first contents list displayed on the display screen; a positional difference calculating unit configured to calculate a positional difference between the obtained first base-point-content position and the obtained focus position; and a first scrolling unit configured to scroll the first contents list displayed on the display screen so that the positional difference decreases.

With this configuration, the display control device scrolls the first contents list displayed on the display screen so that a positional difference between a first base-point-content position which is the position of a base-point content and the focus position is minimized. That is, the display control device scrolls the first contents list to move the base-point content back to the focus position. Consequently, scroll control of a contents list with a content identified by the user as the base-point content as the base point can be performed.

Therefore, when the user searches for a content on the contents list, the user can perform a scroll operation with a content selected and designated by the user as the base point. Thus, the convenience of a scroll operation on the contents list can be improved. This can inhibit the user from performing many operations to cause a heavy load on a device or a significant increase in power consumption.

Moreover, for example, the positional difference calculating unit may include a tension calculating unit configured to calculate, as the positional difference, a magnitude of physical tension virtually produced between the first base-point-content position and the focus position in association with a distance between the first base-point-content position and the focus position; and the first scrolling unit may scroll the first contents list so that the tension decreases in accordance with a virtual restoring force of the tension.

With this configuration, the tension calculating unit calculates the magnitude of tension associated with the distance between the first base-point-content position and the focus position as a positional difference and the first scrolling unit scrolls the first contents list so that the tension decreases in accordance with a virtual restoring force of the tension. That is, the display control device represents the positional difference between the first base-point-content position and the focus position by virtual tension and scrolls the first contents list so that the tension decreases. Consequently, scroll control of a contents list with a content selected by the user as the base-point content as the base point can be performed by using tension, which is a representation intuitive to the user.

Moreover, for example, the display control device may further include a tension displaying unit configured to visualize and display the magnitude of the tension on the display screen. Moreover, for example, the tension displaying unit may represent and display the tension as a virtual rubber cord or spring. Moreover, for example, the tension displaying unit may display the tension, between the first base-point-content position and the focus position.

With this configuration, the display control device visualizes and displays the magnitude of tension between the first base-point-content position and the focus position on the display screen by the tension displaying unit. That is, since the magnitude of the tension is visualized and displayed, the positional difference between the content displayed at the focus position and the base-point content can be visually known. Consequently, scroll control of a contents list with a content selected by the user as the base-point content as the base point can be visually performed.

Moreover, for example, the display control device may further include a positional difference displaying unit configured to visualize and display a magnitude of the positional difference on the display screen. Moreover, for example, the positional difference displaying unit may display the magnitude of the positional difference by making the magnitude of the positional difference correspond to at least one of a length of a line, a thickness of a line, a shade of a color, an arrow, and a number.

With this configuration, the display control device visualizes and displays the magnitude of a positional difference between the first base-point-content position and the focus position on the display screen by the positional difference display unit. That is, since the magnitude of the positional difference is visualized and displayed, the positional difference between the content displayed at the focus position and the base-point content can be visually known. Consequently, scroll control of a contents list with a content selected by the user as the base-point content as the base point can be visually performed.

Moreover, for example, the display control device may further include a base-point-content displaying unit configured to display the base-point content in a region different from the first contents list on the display screen, wherein the positional difference calculating unit includes a tension calculating unit configured to calculate, as the positional difference, a magnitude of physical tension virtually produced between a second base-point-content position and the first base-point-content position in association with a distance between the second base-point-content position and the first base-point-content position, the second-base-point position being a position of a base-point content displayed by the base-point-content displaying unit and having a positional difference from the first base-point-content which corresponds to a positional difference between the first base-point-content position and the focus position; and the first scrolling unit scrolls the first contents list so that the tension decreases in accordance with a virtual restoring force of the tension.

With this configuration, the tension calculating unit calculates the magnitude of tension associated with the distance between the second base-point-content position of a base-point content in a region different from the first contents list and the first base-point-content position as the positional difference and the first scrolling unit scrolls the first contents list so that the tension decreases in accordance with a virtual restoring force of the tension. That is, the display control device represents the positional difference between the second base-point-content position and the first base-point-content position by virtually using tension and scrolls the first contents list so that the tension decreases. Consequently, scroll control of a contents list with a content selected by the user as the base-point content as the base point can be performed by using tension, which is a representation intuitive to the user.

Moreover, for example, the display control device may further include a tension displaying unit configured to visualize and display the magnitude of the tension on the display screen. Moreover, for example, the tension displaying unit may represent and display the tension as a virtual rubber cord or spring. Moreover, for example, the tension displaying unit may display the tension, between the second base-point-content position and the first base-point-content position.

With this configuration, the display control device visualizes and displays the magnitude of tension between the second base-point-content position and the first base-point-content position on the display screen by the tension displaying unit. That is, since the magnitude of the tension is visualized and displayed, the positional difference between the second base-point-content position and the first base-point-content position can be visually known. Consequently, scroll control of a contents list with a content selected by the user as the base-point content as the base point can be visually performed.

Moreover, for example, the display control device may further include a second-contents-list displaying unit configured to display in a region different from the first contents list on the display screen a second contents list which is a list of contents which are candidates for the base-point content, wherein the positional difference calculating unit includes a tension calculating unit configured to calculate, as the positional difference, a magnitude of physical tension virtually produced between a third base-point-content position and the first base-point-content position in association with a distance between the third base-point-content position and the first base-point-content position, the third base-point-content position being a position of a base-point-content identified on the second contents list and having a positional difference from the first base-point-content position which corresponds to a positional difference between the first base-point-content position and the focus position, and the first scrolling unit scrolls the first contents list so that the tension decreases in accordance with a virtual restoring force of the tension.

With this configuration, the tension calculating unit calculates the magnitude of tension associated with the distance between the third base-point-content position identified on the second contents list and the first base-point-content position as the positional difference and the first scrolling unit scrolls the first contents list so that the tension decreases in accordance with a virtual restoring force of the tension. That is, the display control device represents the positional difference between the third base-point-content position and the first base-point-content position by virtually using tension and scrolls the first contents list so that the tension decreases. Consequently, scroll control of a contents list with a content selected and identified by the user as the base-point content as the base point can be performed by using tension, which is a representation intuitive to the user.

Moreover, for example, the display control device may further include a tension displaying unit configured to visualize and display the magnitude of the tension on the display screen. Moreover, for example, the tension displaying unit may represent and display the tension as a virtual rubber cord or spring. Moreover, for example, the tension displaying unit may display the tension, between the third base-point-content position and the first base-point-content position.

With this configuration, the display control device visualizes and displays the magnitude of tension between the third base-point-content position and the first base-point-content position on the display screen by the tension displaying unit. That is, since the magnitude of the tension is visualized and displayed, the positional difference between the third base-point-content position and the first base-point-content position can be visually known. Consequently, scroll control of a contents list with a content selected by the user as the base-point content as the base point can be visually performed.

Moreover, for example, the display control device may further include: a first point obtaining unit configured to accept designation of a first point position which is a position of a first point on the display screen; a second point obtaining unit configured to accept designation of a second point position which is a position of a second point on the display screen; and a second scrolling unit configured to scroll the first contents list so that a positional difference between the first base-point-content position and the focus position corresponds to a positional difference between the first point position and the second point position, wherein the first scrolling unit scrolls the first contents list when the first point obtaining unit no longer accepts designation of the first point position or when the second point obtaining unit no longer accepts designation of the second point position.

With this configuration, the second scrolling unit scrolls the first contents list so that the positional difference between the first base-point-content position and the focus position corresponds to the positional difference between the first point position and the second point position, and the first scrolling unit scrolls the first contents list so that the positional difference decreases when designation of the first point position or the second point position is no longer accepted. That is, the first contents list is scrolled in response to accepting designation of the first point position or the second point position and, when there is no longer designation of the first point position or the second point position, the first contents list scrolls so that the positional difference decreases. Therefore, the first contents list can be flexibly scrolled with two fingers, for example, and, after the scrolling, the first contents list can be scrolled with a content selected by the user as the base point.

Furthermore, the positional difference calculating unit of the display control device may include a tension calculating unit which calculates, as the positional difference between the first base-point-content position and the focus position, the magnitude of physical tension virtually produced between the first base-point-content position and the focus position in association with a distance between the first base-point-content position and the focus position, and the first scrolling unit may scroll the first contents list so that the tension decreases in accordance with a virtual restoring force of the tension.

With this configuration, when designation of the first point position or the second point position is no longer accepted, the tension calculating unit calculates the magnitude of tension associated with the distance between the first base-point content position and the focus position as a positional difference and the first scrolling unit scrolls the first contents list so that the tension decreases in accordance with a virtual restoring force of the tension. That is, the display control device virtually uses tension to represent the positional difference between the first base-point-content position and the focus position after scrolling of the first contents list performed in response to the designation of the first point position and the second point position, and scrolls the first contents list so that the tension decreases. Consequently, scroll control of a contents list with a content selected by the user as the base-point content as the base point can be performed by using tension, which is a representation intuitive to the user.

Moreover, for example, the display control device may further include a tension displaying unit configured to visualize and display the magnitude of the tension on the display screen. Moreover, for example, the tension displaying unit may represent and display the tension as a virtual rubber cord or spring. Moreover, for example, the tension displaying unit may display the tension, between the first point position and the second point position.

With this configuration, the display control device visualizes and displays the magnitude of tension between the first base-point-content position and the focus position on the display screen by the tension display unit during scrolling of the first contents list by the first scrolling unit and the second scrolling unit. That is, since the magnitude of the tension is visualized and displayed, the positional difference between a content displayed at the focus position and the base-point content can be visually known. Consequently, scroll control of a contents list with a content selected by the user as the base-point content as the base point can be visually performed.

Moreover, for example, the first scrolling unit may scroll the first contents list so that the positional difference decreases to a predetermined magnitude in a constant time regardless of a magnitude of the positional difference.

With this configuration, the first scrolling unit scrolls the first contents list in a constant time regardless of the magnitude of the positional difference. That is, the first scrolling unit scrolls the first contents list in a constant time regardless of whether the positional difference is small or large. In this way, the speed of scrolling of the first contents list can be controlled independently of the magnitude of the positional difference.

Moreover, for example, the first scrolling unit may scroll the first contents list so that the positional difference decreases to a predetermined magnitude in a time corresponding to a magnitude of the positional difference.

With this configuration, the first scrolling unit scrolls the first contents list in a time corresponding to the magnitude of the positional difference. For example, the greater the positional difference, the longer the time in which the first scrolling unit scrolls the first contents list. In this way, the speed of scrolling of the first contents list can be controlled according to the magnitude of the positional difference.

Moreover, for example, the first scrolling unit may scroll the first contents list so that the positional difference decreases to a predetermined magnitude in a time corresponding to the number of contents existing between the first base-point-content position and the focus position.

With this configuration, the first scrolling unit scrolls the first contents list in a time corresponding to the number of contents that exist between the first base-point-content position and the focus position. For example, the greater the number of the contents, the longer the time in which the first scrolling unit scrolls the first contents list. In this way, the speed of scrolling of the first contents list can be controlled according to the number of the contents.

Moreover, for example, the first scrolling unit may scroll the first contents list so that the positional difference decreases to a predetermined magnitude in a time corresponding to a relationship between a time instant associated with the base-point content and a time instant associated with a content existing at the focus position.

With this configuration, the first scrolling unit scrolls the first contents list in a time corresponding to the relationship between the time instant associated with the base-point content and the time instant associated with the content existing at the focus position. For example, the first scrolling unit compares the time instant of shooting the base-point content with the time instant of shooting the content existing at the focus point, and the longer the time between the time instants, the longer the time in which the first scrolling unit scrolls the first contents list. In this way, the speed of scrolling of the first contents list can be controlled according to the time instants associated with contents.

Moreover, for example, the base-point-content identifying unit may receive information which identifies the base-point content from another device to identify a base-point content identified by the information.

With this configuration, the base-point-content identifying unit receives information identifying a base-point content from another device to identify the base-point content identified by the information. That is, when the user operates another device to send information identifying the base-point content to the display control device, so that the display control device receives the information and accepts selection of the base-point content identified by the information. In this way, the user can operate a tablet or a mobile terminal to cause the display control device to control scrolling of a contents list displayed on a big-screen television set or the like.

It should be noted that the present invention can not only be implemented as such a display control device but also as a display control method having characteristic units, as steps, performed by the display control device, or as a program for causing a computer to execute such characteristic steps. In addition, such a program can be distributed by being stored in a storage medium such as CD-ROM and via a transmission medium such as the Internet. Moreover, the present invention may be implemented as an integrated circuit that includes the characteristic processing units included in such a display control device. The present invention may also be implemented by any combination of such a system, method, integrated circuit, computer program, and computer-readable recording medium.

Hereinafter, embodiments of the present invention will be described, with reference to the accompanying drawings. It should be noted that the embodiments described below are each merely a preferred illustration of the present disclosure. Values, shapes, materials, components, disposition or a form of connection between the components, steps, and the order of the steps are merely illustrative, and are not intended to limit the present disclosure. Moreover, among components of the below non-limiting embodiments, components not set forth in the independent claims indicating the top level concept of the present disclosure will be described as optional components for preferable embodiments.

(First Embodiment)

A first embodiment of the present invention be described below with reference to drawings.

FIG. 1 is a block diagram illustrating a functional configuration of a display control device 100 in the first embodiment of the present invention.

As illustrated in FIG. 1, the display control device 100 includes a base-point-content selecting unit 110, a base-point-content-position obtaining unit 120, a focus position obtaining unit 130, a positional difference calculating unit 140, a first scrolling unit 150, and a first-contents-list displaying unit 160.

The first-contents-list displaying unit 160 displays a first contents list, which is a scrollable list of contents, on a display screen 101. The first contents list will be detailed later.

The base-point-content selecting unit 110 accepts selection of a base-point content on the first contents list. Here, the base-point content is a content selected by a user from among the contents on the first contents list. That is, the base-point-content selecting unit 110 in this embodiment functions as a base-point-content identifying unit which identifies a base-point content on the first contents list by selection.

Specifically, the base-point-content selecting unit 110 obtains information about selection of a content by a user from a user operation. The base-point-content selecting unit 110 then sets the content selected by the user as the base-point content on the first contents list on the basis of the obtained information about the selection of the content.

The base-point-content-position obtaining unit 120 obtains a first base-point-content position which is the position of a base-point content on the first contents list. The first base-point-content position will be detailed later.

The focus position obtaining unit 130 obtains a focus position, which is a position on the first contents list that is related to a predetermined region on the first contents list displayed on the display screen 101. The focus position will be detailed later.

The positional difference calculating unit 140 calculates a positional difference between a first base-point content position obtained by the base-point-content-position obtaining unit 120 and a focus position obtained by the focus position obtaining unit 130. That is, the positional difference calculating unit 140 finds out the positional relationship between the position of the base-point content on the first contents list set by the base-point-content selecting unit 110 and the focus position.

The first scrolling unit 150 scrolls the first contents list displayed on the display screen 101 so that the positional difference calculated by the positional difference calculating unit 140 decreases. The first scrolling unit 150 also controls scrolling of the contents list on the basis of information about a scroll operation performed by the user. For example, when information about a scroll operation performed by the user indicates an operation to scroll or close the contents list, the first scrolling unit 150 performs scroll controlling of the contents list according to the operation.

Figure 2:
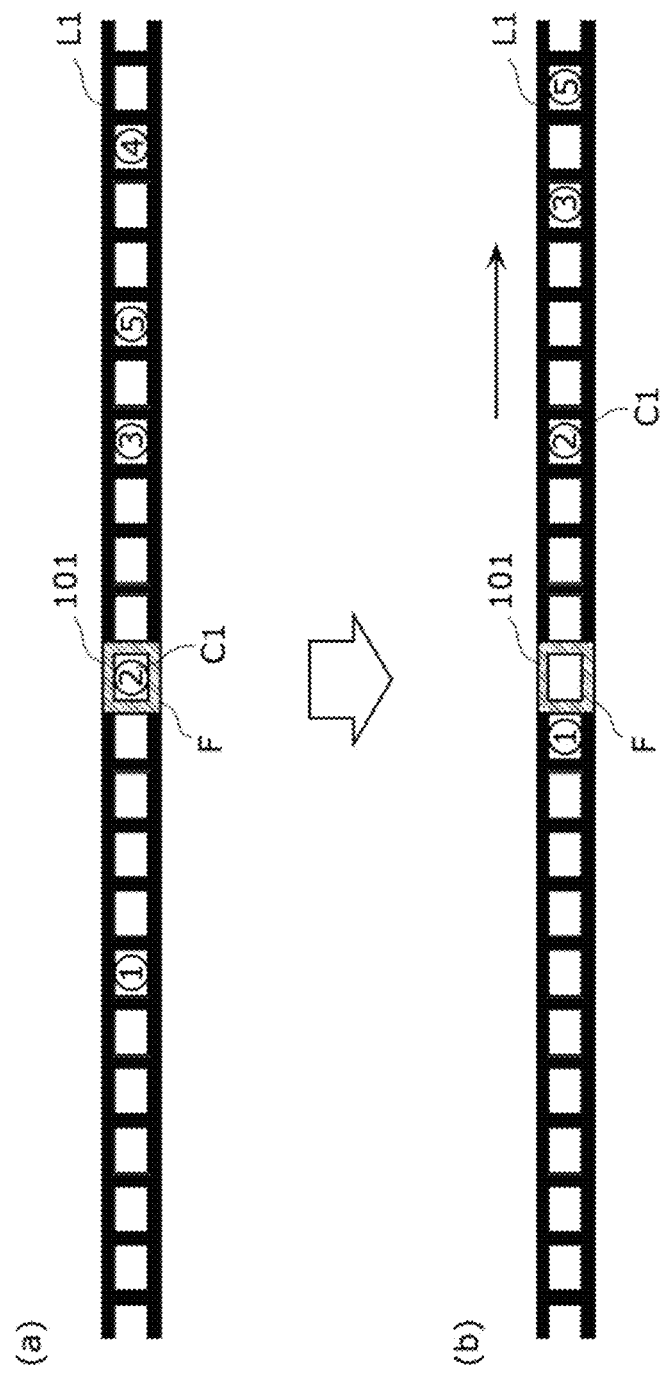
FIG. 2 is a diagram illustrating a first contents list, a base-point-content position, and a focus position in the first embodiment of the present invention.

FIG. 2 is a diagram illustrating the first contents list, the base-point-content position and the focus position in the first embodiment of the present invention.

As illustrated in (a) of FIG. 2, the first contents list L1 represents a list of contents such as photographs or moving images shot and obtained, for example, arranged in the order in which the contents are shot and obtained. The display screen 101 represents a screen area that appears on a screen or touch panel of a television set, a personal computer, a tablet, a mobile terminal or the like. The shaded area represents the focus position F on the first contents list L1 and is fixedly disposed on the display screen 101.

In (a) of FIG. 2, content 2 is currently selected as the base-point content on the first contents list L1 and is placed at the focus position F on the first contents list That is, a first base-point-content position C1 coincides with the focus position F. The user can perform a scroll operation on the first contents list. L1.

Part (b) of FIG. 2 illustrates a transition state after the user has performed a scroll operation on the first contents list L1 in the state in (a) of FIG. 2. Here, the first contents list L1 is scrolled by four contents rightward. In this state, there is a positional difference between the first base-point-content position C1, which is the position of the base-point content 2, and the focus position F on the first contents list L1.

Figure 3:
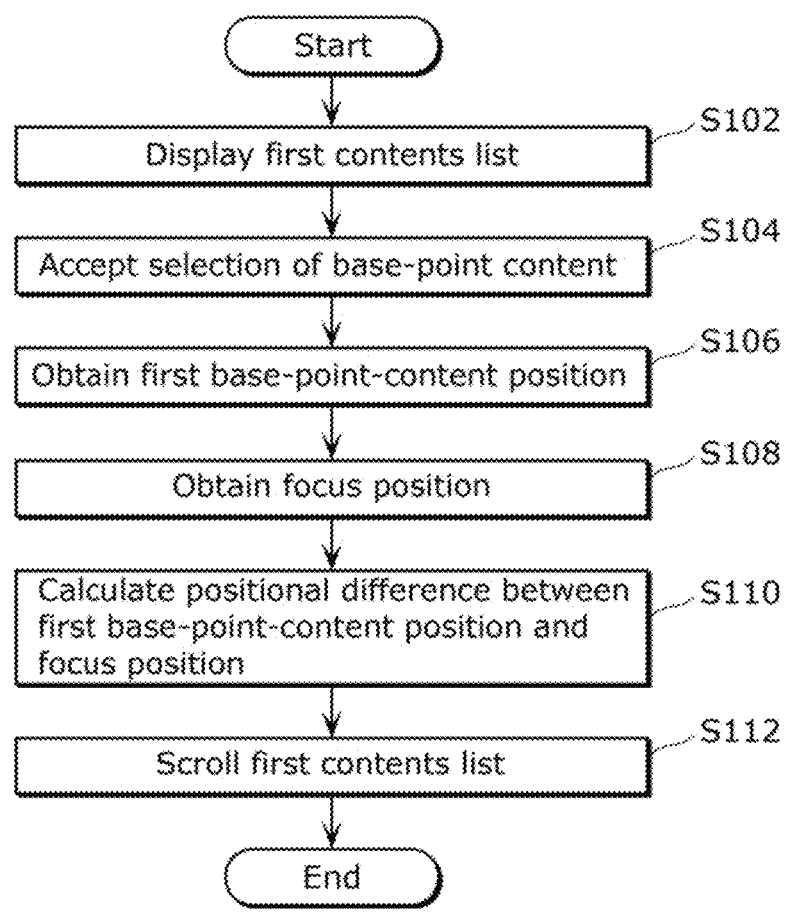
FIG. 3 is a flowchart illustrating an example of a process performed by the display control device in the first embodiment of the present invention.

FIG. 3 is a flowchart illustrating an example of a process performed by the display control device 100 in the first embodiment of the present invention.

Figure 4:
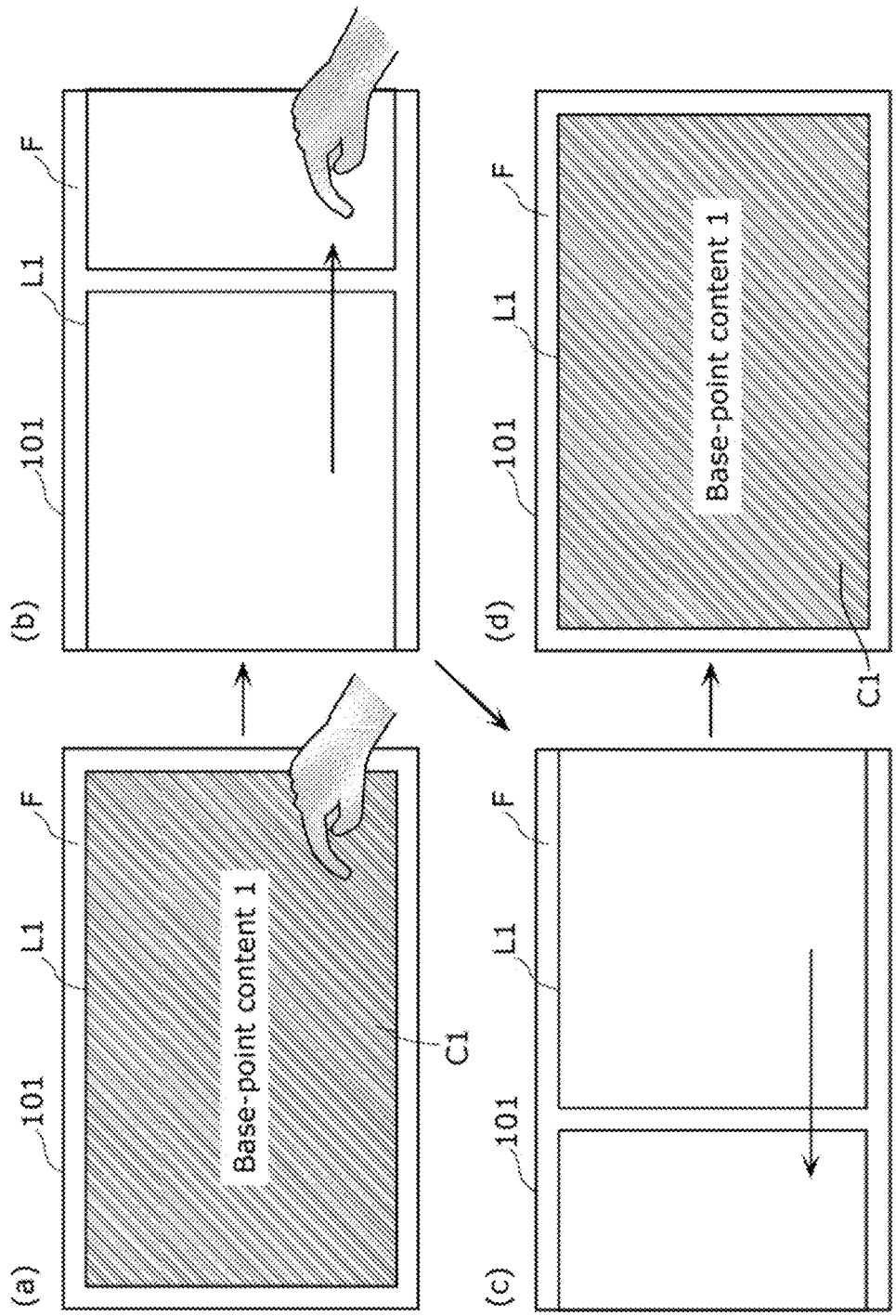
FIG. 4 is a diagram illustrating a process performed by the display control device in the first embodiment of the present invention.

FIG. 4 is a diagram illustrating a process performed by the display control device 100 in the first embodiment of the present invention.

As illustrated in FIG. 3, first the first-contents-list displaying unit 160 displays a first contents list, which is a scrollable list of contents, on the display screen 101 (S102). Specifically, the first-contents-list displaying unit 160 displays the first contents list L1 on the display screen 101 as illustrated in (a) of FIG. 4.

Returning to FIG. 2, the base-point-content selecting unit 110 accepts selection of a base-point content on the first contents list (S104). For example, when the user scrolls the first contents list L1 on the display screen 101 to search for a content the user wants to uses as the base-point and selects the base-point content 1 as illustrated in (a) of FIG. 4, the base-point-content selecting unit 110 accepts the selection of the base-point content.

Returning to FIG. 2, the base-point-content-position obtaining unit 120 obtains a first base-point-content position, which is the position of the base-point content on the first contents list (S106). Specifically, as illustrated in (b) of FIG. 4, the user scrolls the first contents list L1 and the base-point-content-position obtaining unit 120 obtains the first base-point-content position C1 after the scrolling. Here, the base-point-content-position obtaining unit 120 obtains the first base-point-content position C1 on the basis of the distance over which the first contents list L1 has scrolled.

Returning to FIG. 2, the focus position obtaining unit 130 obtains a focus position, which is a position on the first contents list that is related to a predetermined region on the first contents list displayed on the display screen 101 (S108). Specifically, the focus position obtaining unit 130 obtains the focus position F as illustrated in (a) or (b) of FIG. 4. Here, the focus position F is placed in a region surrounding the entire display screen 101.

Returning to FIG. 2, the positional difference calculating unit 140 calculates a positional difference between the first base-point-content position obtained by the base-point-content-position obtaining unit 120 and the focus position obtained by the focus position obtaining unit 130 (S110). That is, the positional difference calculating unit 140 calculates a positional difference between the first base-point-content position C1 and the focus position F.

Then the first scrolling unit 150 scrolls the first contents list displayed on the display screen 101 so that the positional difference calculated by the positional difference calculating unit 140 decreases (S112). Specifically, as illustrated in (c) of FIG. 4, the first scrolling unit 150 scrolls the first contents list L1 so that the positional difference between the first base-point-content position C1 and the focus position F decreases. When the base-point content is placed at the focus position F as illustrated in (d) of FIG. 4, the first scrolling unit 150 ends scrolling the first contents list L1.

That is, when the user takes the finger off the display screen 101, the first contents list L1 is controlled to scroll so that the base-point content 1 moves toward the center of the screen and, when the user performs no operation on the first contents list L1 for a while, the base-point content 1 is eventually positioned at the center of the screen.

As has been descried above, the display control device 100 in the first embodiment of the present invention scrolls the first contents list displayed on the display screen so that a positional difference between the first base-point-content position, which is the position of the base-point content, and the focus position decreases. That is, the display control device 100 scrolls the first contents list to move the base-point content back to the focus position. In this way, scroll control of a contents list with a content selected by the user as the base-point content as the base point can be performed.

Thus, when the user searches for a content on the contents list, the user can perform a scroll operation with the selected content as the base point and the convenience of scrolling of the contents list therefore can be improved. This can inhibit the user from performing many operations to cause a heavy load on the device or a significant increase in power consumption.

(Second Embodiment)

A display control device 200 in a second embodiment of the present invention will be described next.

Figure 5:
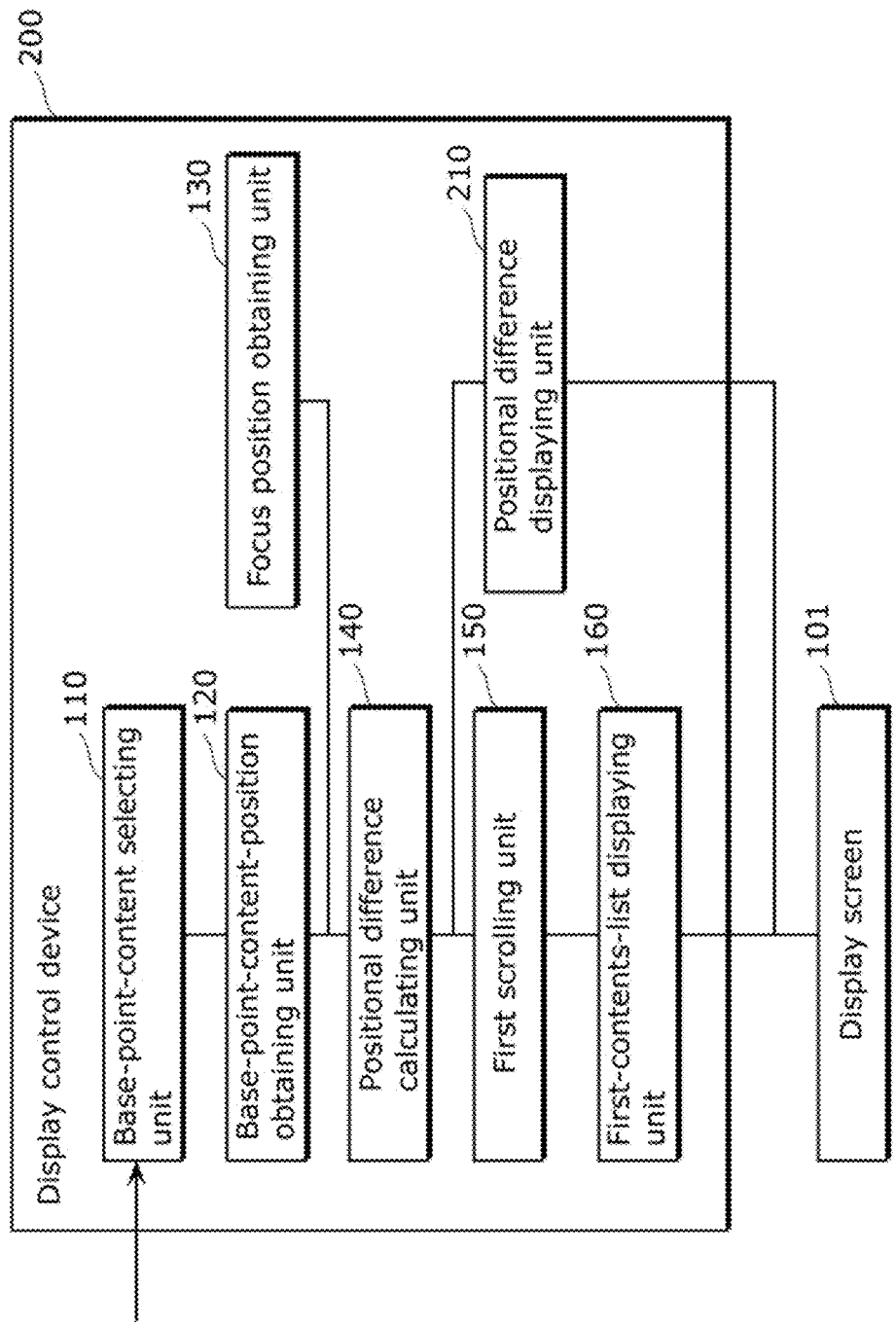
FIG. 5 is a block diagram illustrating a functional configuration of a display control device in a second embodiment of the present invention.

FIG. 5 is a block diagram illustrating a functional configuration of the display control device 200 in the second embodiment of the present invention.

As illustrated in FIG. 5, the display control device 200 includes a base-point-content selecting unit 110, a base-point-content-position obtaining unit 120, a focus position obtaining unit 130, a positional difference calculating unit 140, a first scrolling unit 150, a first-contents-list displaying unit 160, and a positional difference displaying unit 210.

The base-point-content selecting unit 110, the base-point-content-position obtaining unit 120, the focus position obtaining unit 130, the positional difference calculating unit 110, the first scrolling unit 150, and the first-contents-list displaying unit 160 have the same functions as the equivalent units of the display control device 100 in the first embodiment described above and therefore detailed description of these units will be omitted here.

The positional difference displaying unit 210 visualizes and displays on a display screen 101 the magnitude of a positional difference calculated by the positional difference calculating unit 140. Specifically, the positional difference displaying unit 210 displays the magnitude of a positional difference by making the magnitude of the positional difference correspond to at least one of a length of a line, a thickness of a line, a shade of a color, an arrow, and a number.

Note that the display control device 200 may include a positional difference representing unit (not depicted) which represents the magnitude of the positional difference using sound volume, in addition to or instead of the positional difference calculating unit 140.

Figure 6:
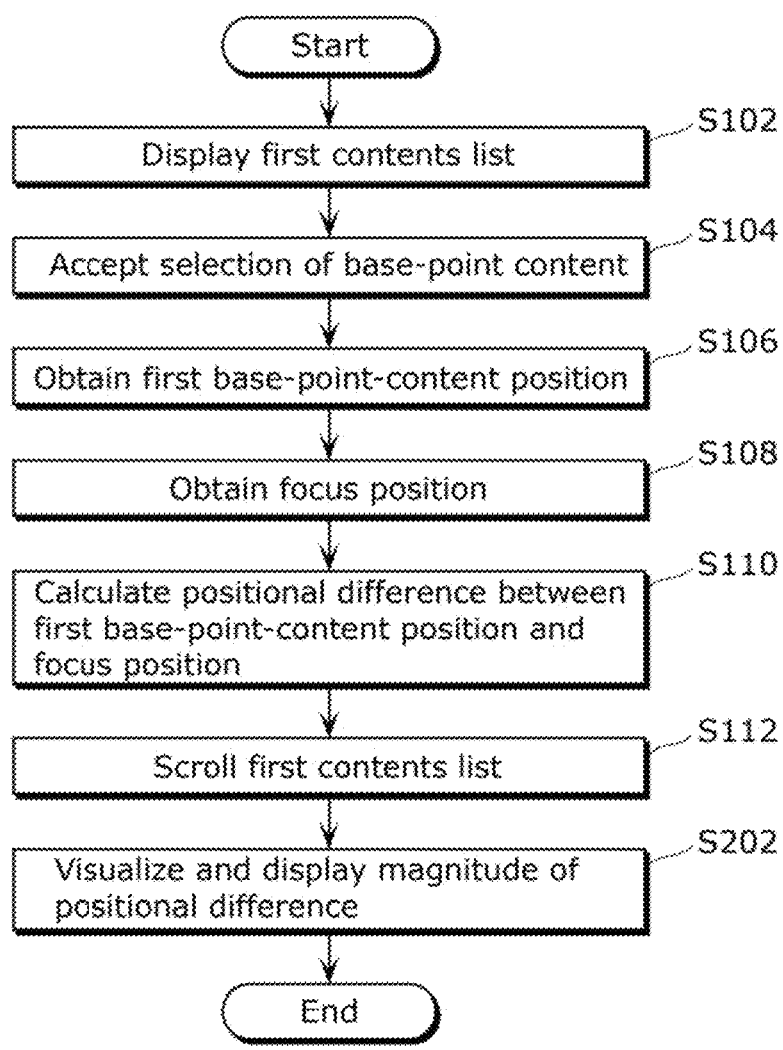
FIG. 6 is a flowchart illustrating an example of a process performed by the display control device in the second embodiment of the present invention.

FIG. 6 is a flowchart illustrating an example of a process performed by the display control device 200 in the second embodiment of the present invention.

Figure 7:
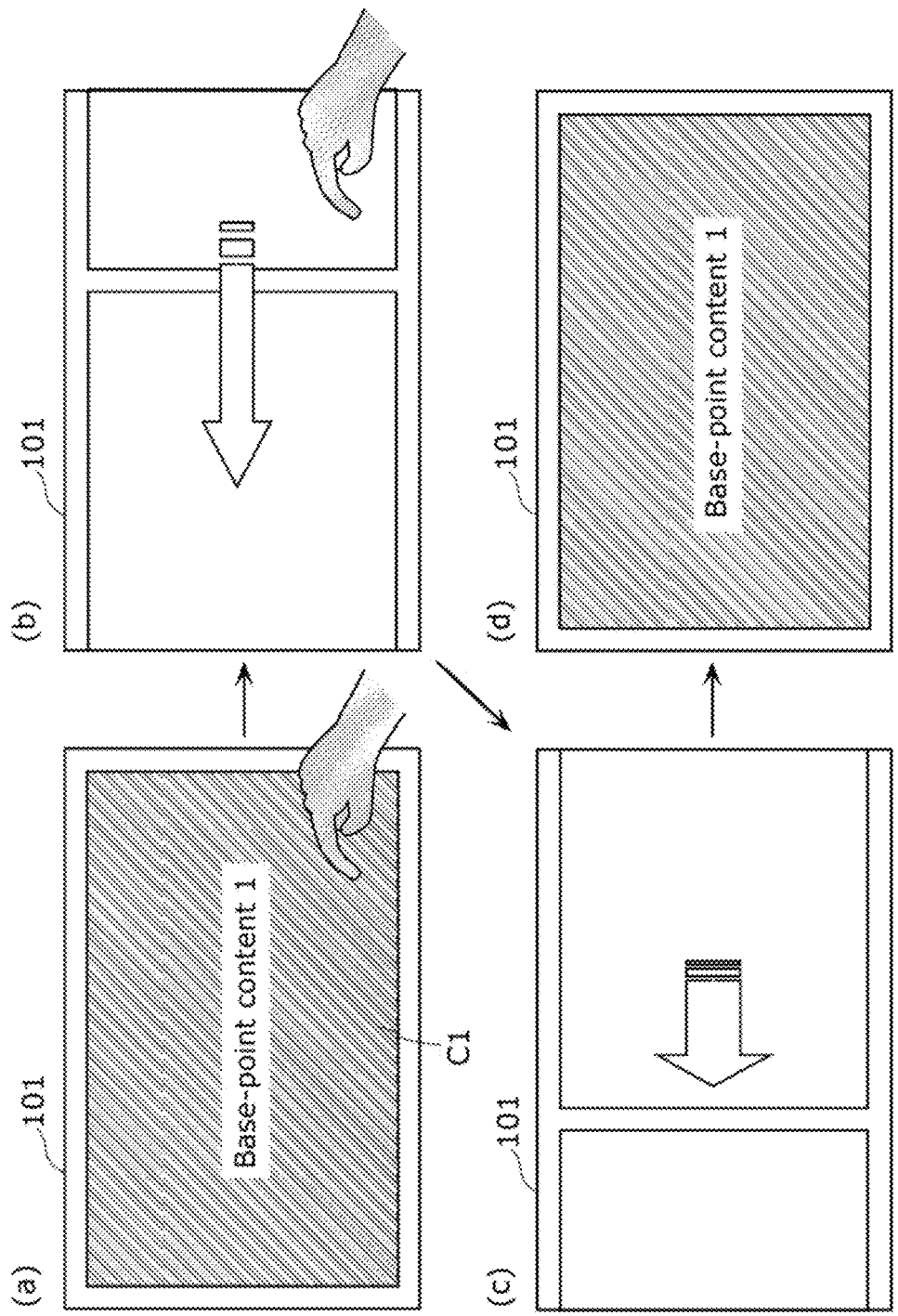
FIG. 7 is a diagram illustrating a process performed by the display control device in the second embodiment of the present invention.

FIG. 7 is a diagram illustrating a process performed by the display control device 200 in the second embodiment of the present invention.

In FIG. 6, the process from displaying the first contents list on the display screen 101 by the first-contents-list displaying unit 160 (S102) to scrolling the first contents list by the first scrolling unit 150 (S112) is the same as the process performed by the display control device 100 in the first embodiment described above (S102 through S112 in FIG. 3) and therefore detailed description of that part of the process will be omitted.

As illustrated in FIG. 6, the positional difference displaying unit 210 visualizes and displays on a display screen 101 the magnitude of a positional difference calculated by the positional difference calculating unit 140 (S202). For example, as illustrated in (b) and (c) of FIG. 7, the positional difference displaying unit 210 displays the magnitude of the positional difference on the display screen 101 as the length and thickness of an arrow that correspond to the magnitude of the positional difference. That is, for example the positional difference displaying unit 210 displays an arrow in such a way that the arrow becomes longer and thinner as illustrated in (b) of FIG. 7 as the magnitude of the positional difference increases and becomes shorter and thicker as illustrated in (c) of FIG. 7 as the magnitude of the positional difference decreases.

As has been described above, according to the display control device 200 in the second embodiment of the present invention, the positional difference displaying unit 210 visualizes and displays the magnitude of a positional difference between the first base-point-content position and the focus position on the display screen. That is, since the magnitude of the positional difference is visualized and displayed, the positional difference between the content displayed at the focus position and the base-point content can be visually known. Consequently, scroll control of a contents list with a content selected by the user as the base-point content as the base point can be visually performed.

(Third Embodiment)

A display control device 300 in a third embodiment of the present invention will be described next.

Figure 8:
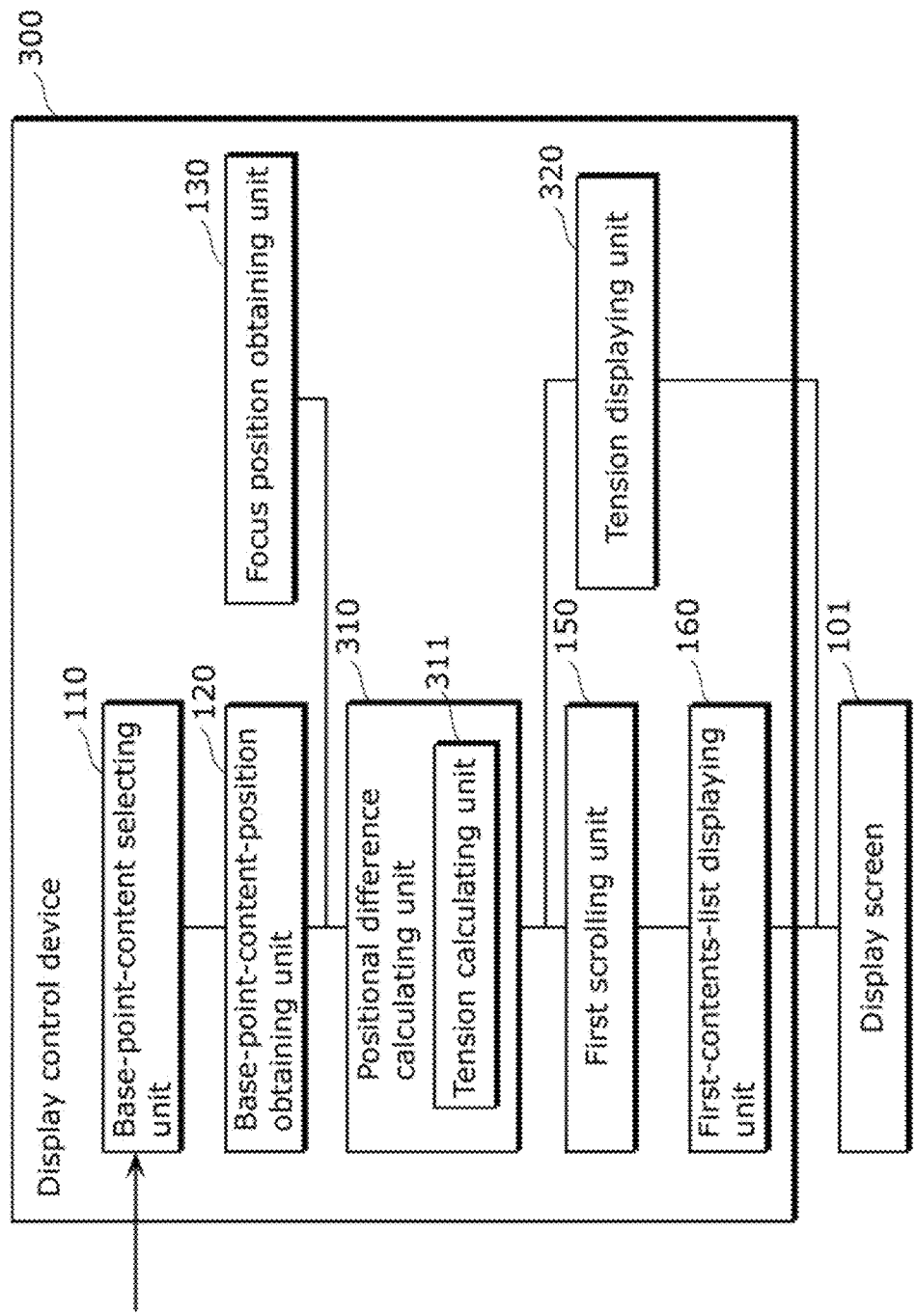
FIG. 8 is a block diagram illustrating a functional configuration of a display control device in a third embodiment of the present invention.

FIG. 8 is a block diagram illustrating a functional configuration of a display control device 300 in the third embodiment of the present invention.

As illustrated in FIG. 8, the display control device 300 includes a base-point-content selecting unit 110, a base-point-content-position obtaining unit 120, a focus position obtaining unit 130, a positional difference calculating unit 310, a first scrolling unit 150, a first-contents-list displaying unit 160, and a tension displaying unit 320.

The base-point-content selecting unit 110, the base-point-content-position obtaining unit 120, the focus position obtaining unit 130, the first scrolling unit 150 and the first-contents-list displaying unit 160 are the same as the equivalent units of the display control device 100 in the first embodiment described above and therefore detailed description of those units will be omitted here.

The positional difference calculating unit 310 includes a tension calculating unit 311. The tension calculating unit 311 calculates, as a positional difference between a first base-point-content position and the focus position, the magnitude of physical tension virtually produced between the first base-point-content position and the focus position in association with a distance between the first base-point-content position and the focus position.

The first scrolling unit 150 scrolls a first contents list so that the tension decreases according to a virtual restoring force of the tension calculated by the tension calculating unit 311.

The tension displaying unit 320 visualizes and displays the magnitude of tension on a display screen 101. The tension displaying unit 320 represents and displays the tension as a virtual rubber cord or a spring. The tension displaying unit 320 displays the tension between the first base-point-content position and the focus position.

The display control device 300 may include a tension representing unit (not depicted) which represents the magnitude of the tension as sound volume, in addition to or instead of the tension displaying unit 320. This applies correspondingly to the embodiments described below.

Figure 9:
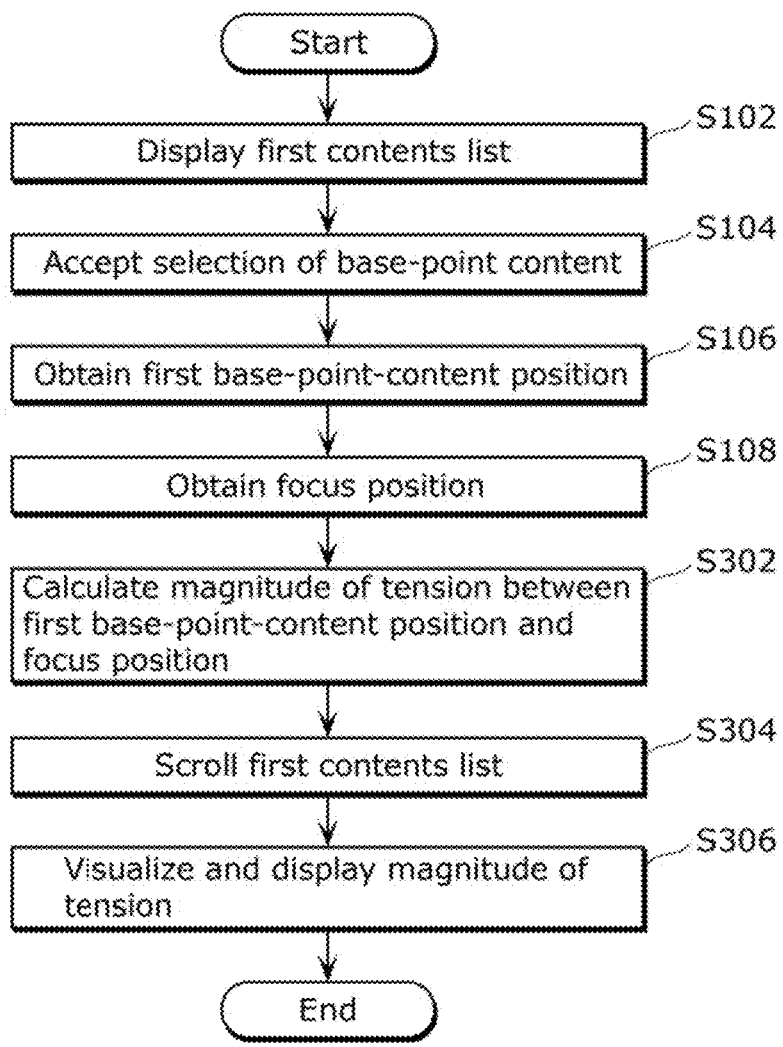
FIG. 9 is a flowchart illustrating an example of a process performed by the display control device in the third embodiment of the present invention.

FIG. 9 is a flowchart illustrating an example of a process performed by the display control device 300 in the third embodiment of the present invention.

Figure 10:
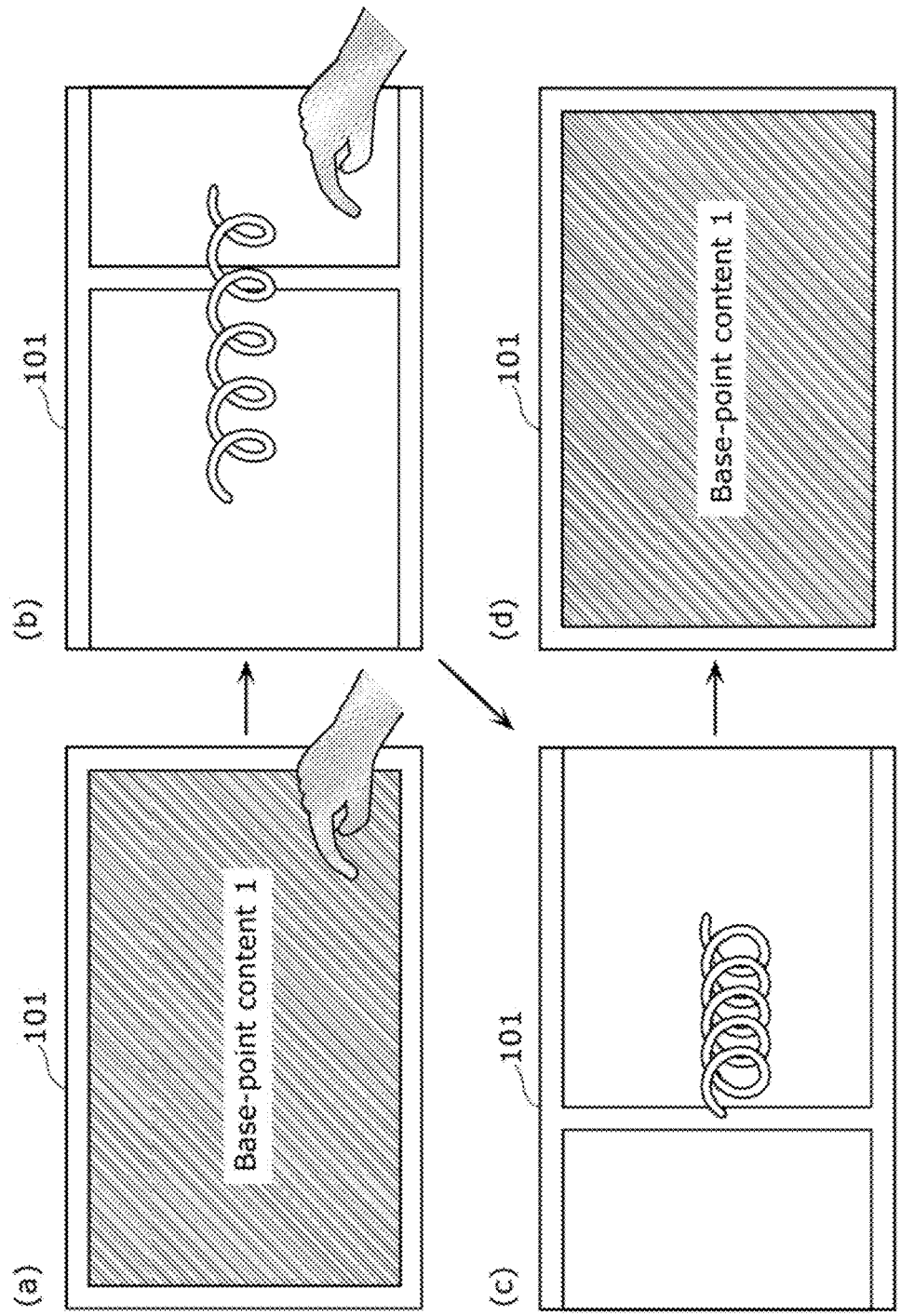
FIG. 10 is a flowchart illustrating a process performed by the display control device in the third embodiment of the present invention.

FIG. 10 is a diagram illustrating a process performed by the display control device 300 in the third embodiment of the present invention.

In FIG. 8, the process from displaying the first contents list on the display screen 101 by the first-contents-list displaying unit 160 (S102) to obtaining the focus position by the focus position obtaining unit 130 (S108) is the same as the process performed by the display control device 100 in the first embodiment described above (S102 through S108 in FIG. 3) and therefore detailed description of that part of the process will be omitted here.

As illustrated in FIG. 9, the tension calculating unit 311 calculates the magnitude of physical tension virtually produced between the first base-point-content position and the focus position in association with a distance between the first base-point-content position and the focus position (S302).

The first scrolling unit 150 scrolls a first contents list so that the tension decreases in accordance with a virtual restoring force of the tension calculated by the tension calculating unit 31 (S304).

The tension displaying unit 320 visualizes and displays the magnitude of tension on the display screen 101 (S306). For example, as illustrated in (b) and (c) of FIG. 10, the tension displaying unit 320 represents and displays the tension as a virtual spring on the display screen 101.

The graphics of the spring is not limited to the example depicted in FIG. 10. For example, the magnitude of tension may be represented as a spring that is different from the depicted spring in the number of winds, thickness, size, or shape or may be represented as a rubber cord that changes in thickness as the rubber cord stretches in illustrated in FIG. 10. The position of the spring is not limited to the example depicted. The spring may be displayed in any place on the screen.

As has been descried above, according to the display control device 300 in the third embodiment of the present invention, the tension calculating unit 311 calculates the magnitude of tension associated with the distance between the first base-point-content position and the focus position as a positional difference and the first scrolling unit 150 scrolls the first contents list so that the tension decreases in accordance with a virtual restoring force of the tension. That is, the display control device 300 virtually represents the positional difference between the first base-point-content position and the focus position as tension and scrolls the first contents list so that the tension decreases. Consequently, scroll control of a contents list with a content selected by the user as the base-point content as the base point can be performed by using tension, which is a representation intuitive to the user.

The tension displaying unit 320 of the display control device 300 visualizes and displays on the display screen 101 the magnitude of tension between the first base-point-content position and the focus position. That is, since the magnitude of the tension is visualized and displayed, the positional difference between the content displayed at the focus position and the base-point content can be visually known. Consequently, scroll control of a contents list with a content selected by the user as the base-point content as the base point can be visually performed.

(Fourth Embodiment)

A display control device 400 in a fourth embodiment of the present invention will be described next.

Figure 11:
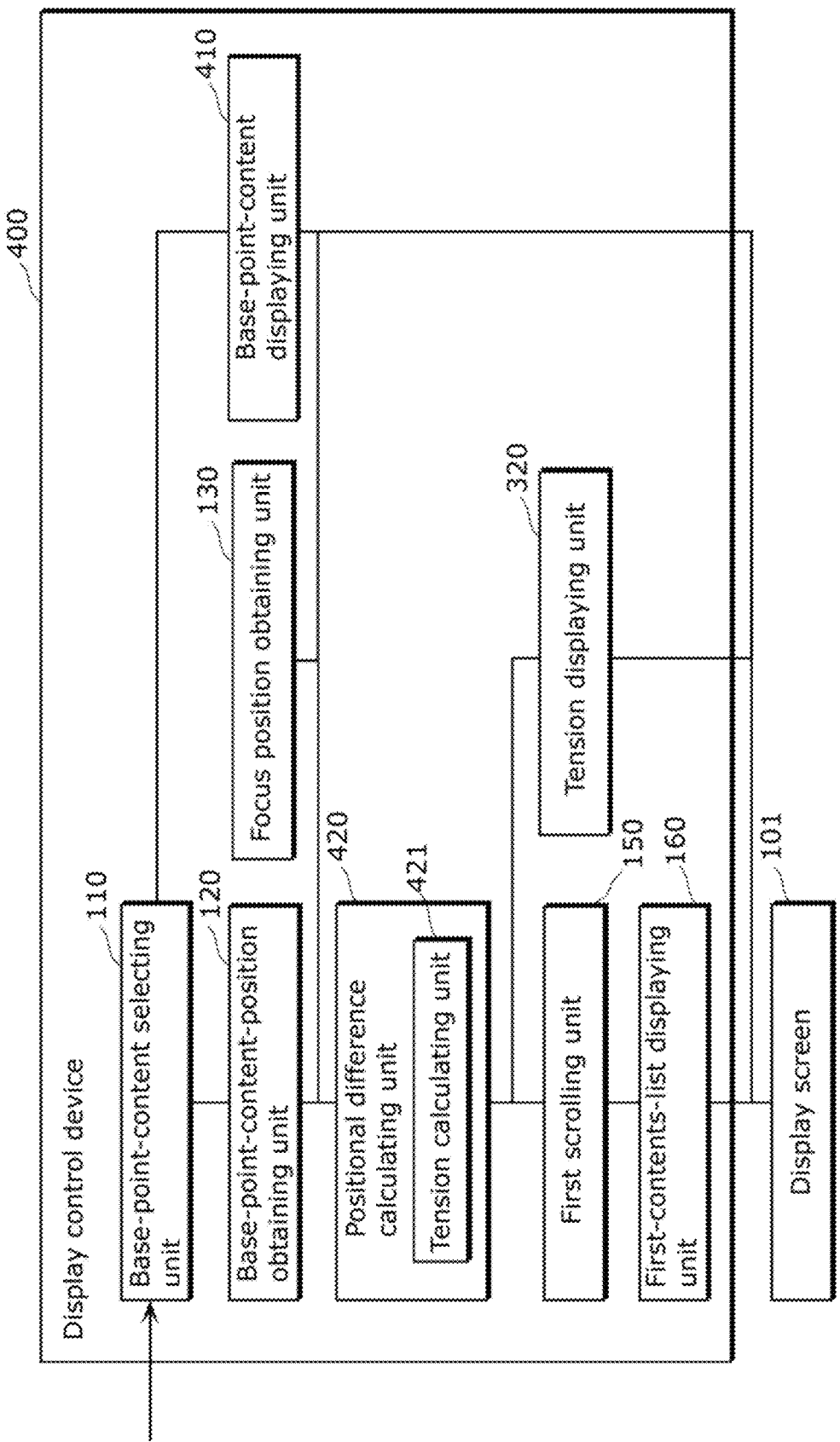
FIG. 11 is a block diagram illustrating a functional configuration of a display control device in a fourth embodiment of the present invention.

FIG. 11 is a block diagram illustrating a functional configuration of the display control device 400 in the fourth embodiment of the present invention.

As illustrated in FIG. 11, the display control device 400 includes a base-point-content selecting unit 110, a base-point-content-position obtaining unit 120, a focus position obtaining unit 130, a base-point-content displaying unit 410, a positional difference calculating unit 420, a first scrolling unit 150, a first-contents-list displaying unit 160, and a tension displaying unit 320.

The base-point-content selecting unit 110, the base-point-content-position obtaining unit 120, the focus position obtaining unit 130, the first scrolling unit 150 and the first-contents-list displaying unit 160 are the same as the equivalent units of the display control device 100 in the first embodiment descried above and therefore detailed description of those units will be omitted here. The tension displaying unit 320 has the same function as the tension displaying unit 320 of the display control device 300 in the third embodiment and therefore detailed description of the tension displaying unit 320 will be omitted.

The base-point-content displaying unit 410 displays a base-point content in a region on a display screen 101 that is different from the region in which a first contents list is displayed.

The positional difference calculating unit 420 includes a tension calculating unit 421. The tension calculating unit 421 calculates, as a positional difference between a first base-point-content position and the focus position, the magnitude of physical tension virtually produced between the first base-point-content position and a second base-point-content position in association with a distance between the first base-point-content position and the second base-point-content position. Here, the second base-point-content position is a position of a base-point content displayed by the base-point-content displaying unit 410 and whose positional difference from the first base-point-content position corresponds to a positional difference between the first base-point-content position and the focus position.

The first scrolling unit 150 scrolls the first contents list so that the tension decreases in accordance with a virtual restoring force of the tension calculated by the tension calculating unit 421.

The tension displaying unit 320 visualizes and displays the magnitude of tension on a display screen 101. The tension displaying unit 320 represents and displays the tension as a virtual rubber cord or spring. The tension displaying unit 320 displays the tension between the second base-point-content position and the first base-point-content position.

Figure 12:
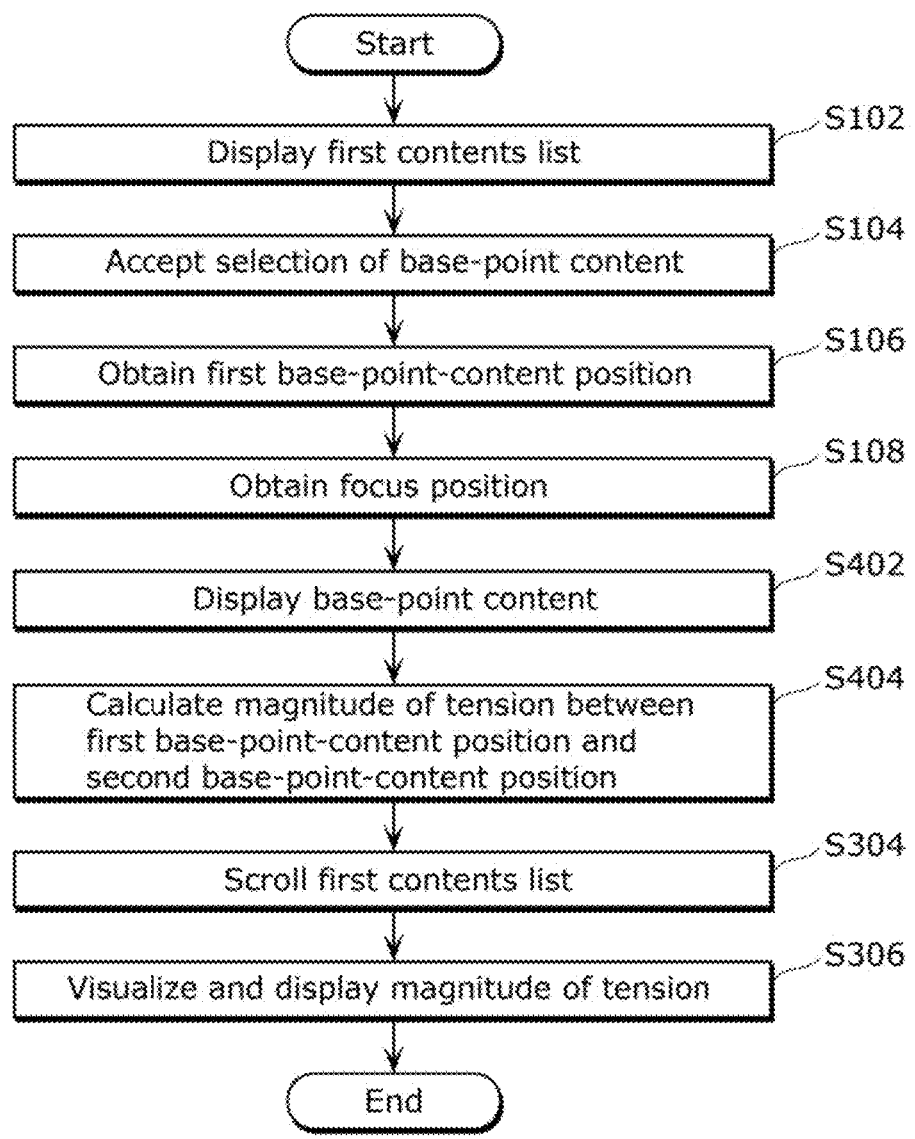
FIG. 12 is a flowchart illustrating an example of a process performed by the display control device in the fourth embodiment of the present invention.

FIG. 12 is a flowchart illustrating an example of process performed by the display control device 400 in the fourth embodiment of the present invention.

Figure 13:
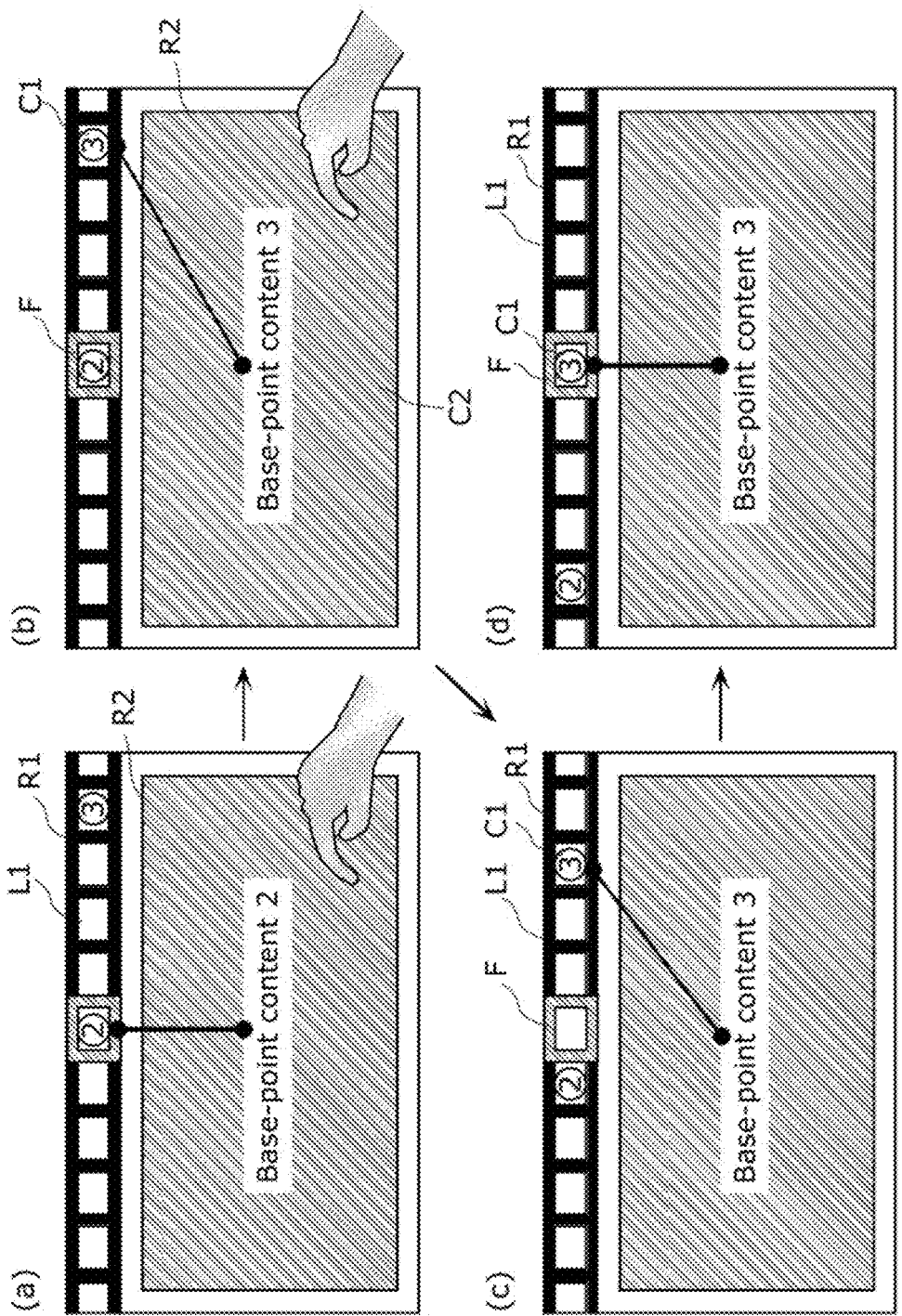
FIG. 13 is a diagram illustrating a process performed by the display control device in the fourth embodiment of the present invention.
Figure 14:
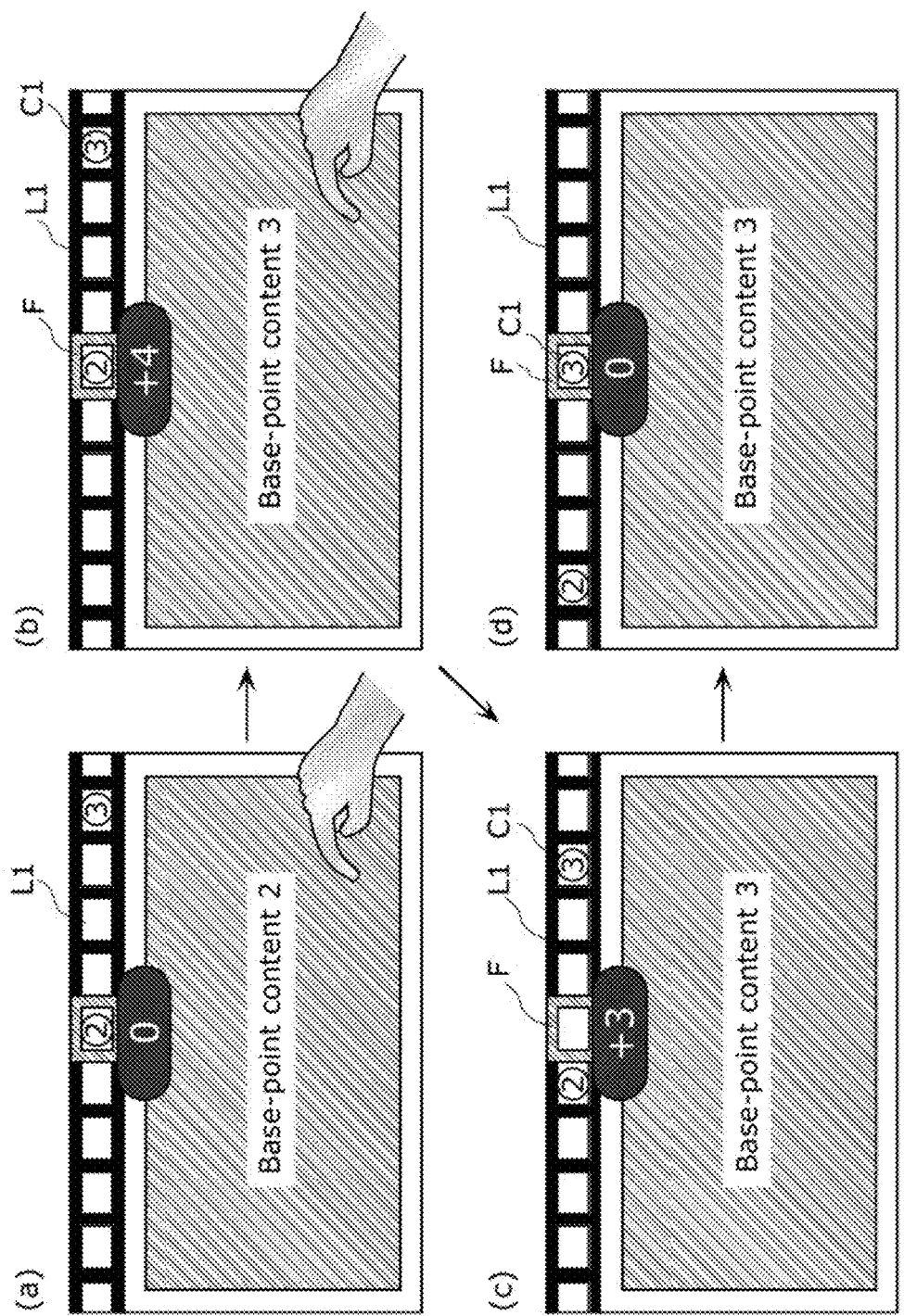
FIG. 14 is a diagram illustrating a process performed by the display control device in the fourth embodiment of the present invention.

FIGS. 13 and 14 are diagrams illustrating processes performed by the display control device 400 in the fourth embodiment of the present invention.

In FIG. 12, the process from displaying the first contents list on the display screen 101 by the first-contents-list displaying unit 160 (S102) to obtaining the focus position by the focus position obtaining unit 130 (S108) is the same as the process performed by the display control device 100 in the first embodiment described above (S102 through S108 in FIG. 3) and therefore detailed description of that part of the process will be omitted here.

The base-point-content displaying unit 410 displays a base-point content in a region on a display screen 101 that is different from the region in which a first contents list is displayed, as illustrated in FIG. 12 (S402). Specifically, the screen is configured as illustrated in (a) of FIG. 13, so that a first contents list L1, which is a list of contents shot and obtained, is displayed in a first layer R1 and a list of candidate base-point contents selected from the shot and obtained first contents list L1 by a user is displayed in a second layer R2.

Returning to FIG. 12, the tension calculating unit 421 calculates the magnitude of physical tension virtually produced between a second-base-point-content position and a first base-point-content position of a base-point content displayed by the base-point-content displaying unit 410 in association with a distance between the first-base-point-content position and the second-base-point-content position (S404). Specifically, when a base-point content 3 is selected as illustrated in (b) of FIG. 13, the tension calculating unit 421 calculates the magnitude of tension produced in association with the distance between the first base-paint-content position C1 of the base-point content 3 and the second base-point-content position C2 of the base-point content 3.

The second base-point-content position C2 is a position in the second layer R2 displayed by the base-point content displaying unit 410 and whose positional difference from the first base-point-content position C1 corresponds to a positional difference between the first base-point-content position C1 and the focus position F. That is, the magnitude of the horizontal positional difference between the first base-point-content position C1 and the second base-point-content position C2 in FIG. 12 is equal to the magnitude of the horizontal positional difference between the first base-point-content position C1 and the focus position F.

Returning to FIG. 12, the first scrolling unit 150 scrolls the first contents list so that tension calculated by the tension calculating unit 421 decreases in accordance with a virtual restoring force of the tension (S304). The tension displaying unit 320 visualizes and displays the magnitude of the tension on the display screen 101 (S306).

In this way, the user scrolls the selection list of base-point contents displayed in the second layer R2 as illustrated in (a) to (b) of FIG. 13 to select and change a base-point content. Then the first contents list L1 displayed in the first layer R1 is controlled to scroll so that the first base-point content position C1 moves to the focus position F as illustrated in (c) to (d) of FIG. 13 unless the user subsequently performs an operation.

In the example in FIG. 13, the tension displaying unit 320 represents the tension acting on the first contents list L1 as a rubber cord that links between the base-point content on the first contents list L1 displayed in the first layer R1 and the base-point content on the selection list displayed in the second layer R2.

An example in FIG. 14, in which user operations and screen transitions are the same as in those in the example illustrated in FIG. 13, illustrates a process in which a first contents list L1 is controlled to scroll so that the first base-point-content position C1 moves to the focus position F as depicted in (a) to (d) of FIG. 14. Specifically, FIG. 14 illustrates a method in which the tension displaying unit 320 numerically indicates where the first base-point-content position C1 is located with respect to the focus position F to show the process of scroll control more clearly to the user. The display control device 400 may represent a scroll control process by voice or other representation.

As has been descried above, according to the display control device 400 in the fourth embodiment of the present invention, the tension calculating unit 421 calculates the magnitude of tension associated with the distance between the second base-point-content position in a region different from the region where the first contents list is located and the first base-point-content position as a positional difference and the first scrolling unit 150 scrolls the first contents list so that the tension decreases in accordance with a virtual restoring force of the tension. That is, the display control device 400 virtually represents the positional difference between the second base-point-content position and the first base-point-content position as tension and scrolls the first contents list so that the tension decreases. Consequently, scroll control of a contents list with a content selected by the user as the base-point content as the base point can be performed by using tension, which is a representation intuitive to the user.

The display control device 400 visualizes and displays the magnitude of tension between the second base-point-content position and the first base-point-content position on the display screen 101 by the tension displaying unit 320. That is, since the magnitude of the tension is visualized and displayed, the positional difference between the second base-point-content position and the first base-point-content position can be visually known. Consequently, scroll control of a contents list with a content selected by the user as the base-point content as the base point can be visually performed.

(Fifth Embodiment)

A display control device 500 in a fifth embodiment of the present invention will be described next.

Figure 15:
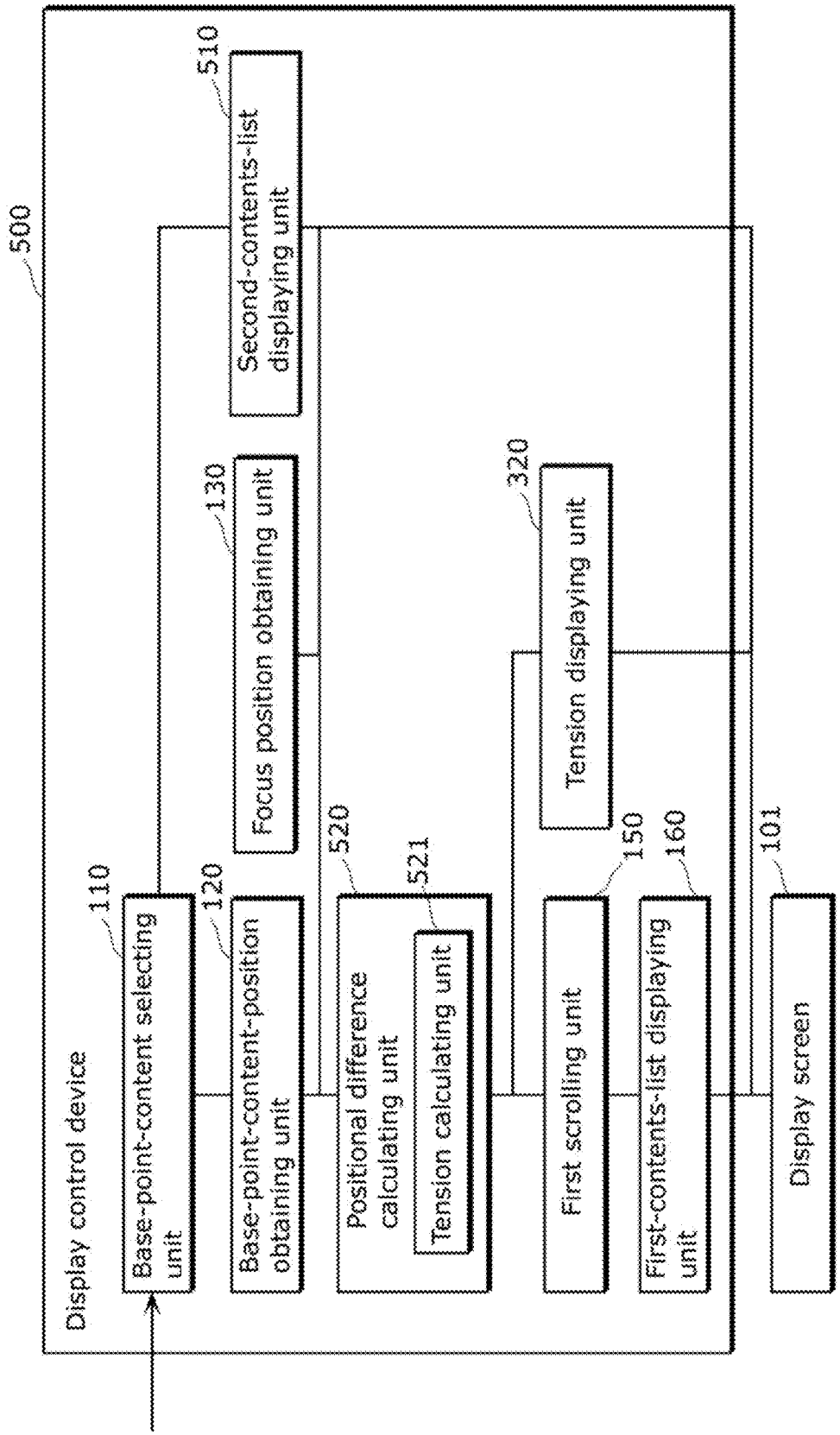
FIG. 15 is a block diagram illustrating a functional configuration of a display control device in a fifth embodiment of the present invention.

FIG. 15 is a block diagram illustrating a functional configuration of the display control device 500 in the fifth embodiment of the present invention.

As illustrated in FIG. 15, the display control device 500 includes a base-point-content selecting unit 110, a base-point-content-position obtaining unit 120, a focus position obtaining unit 130, a second-contents-list displaying unit 510, a positional difference calculating unit 520, a first scrolling unit 150, a first-contents-list displaying unit 160, and a tension displaying unit 320.

The base-point-content selecting unit 110, the base-point-content-position obtaining unit 120, the focus position obtaining unit 130, the first scrolling unit 150 and the first-contents-list displaying unit 160 are the same as the equivalent units of the display control device 100 in the first embodiment described above and therefore detailed description of those units will be omitted here. The tension displaying unit 320 has the same function as the tension displaying unit 320 of the display control device 300 in the third embodiment and therefore detailed description of the tension displaying unit 320 will be omitted.

The second-contents-list displaying unit 510 displays a second contents list, which is a list of contents that are candidates for the base-point content, in a region on a display screen 101 that is different from the region where a first contents list is displayed.

The positional difference calculating unit 520 includes a tension calculating unit 521. The tension calculating unit 521 calculates, as a positional difference between a first base-point-content position and the focus position, the magnitude of physical tension virtually produced between a third base-point-content position and a first base-point-content position in association with a distance between the third base-point-content position and the first base-point-content position. Here, the third base-point-content position is a position of a base-point content selected on the second contents list and whose positional difference from the first base-point-content position corresponds to a positional difference between the first base-point-content position and the focus position.

The first scrolling unit 150 scrolls the first contents list so that the tension decreases in accordance with a virtual restoring force of the tension calculated by the tension calculating unit 521.

The tension displaying unit 320 visualizes and displays the magnitude of tension on a display screen 101. The tension displaying unit 320 represents and displays the tension as a virtual rubber cord or a spring. The tension displaying unit 320 displays the tension between the first base-point-content position and the third base-point-content position.

Figure 16:
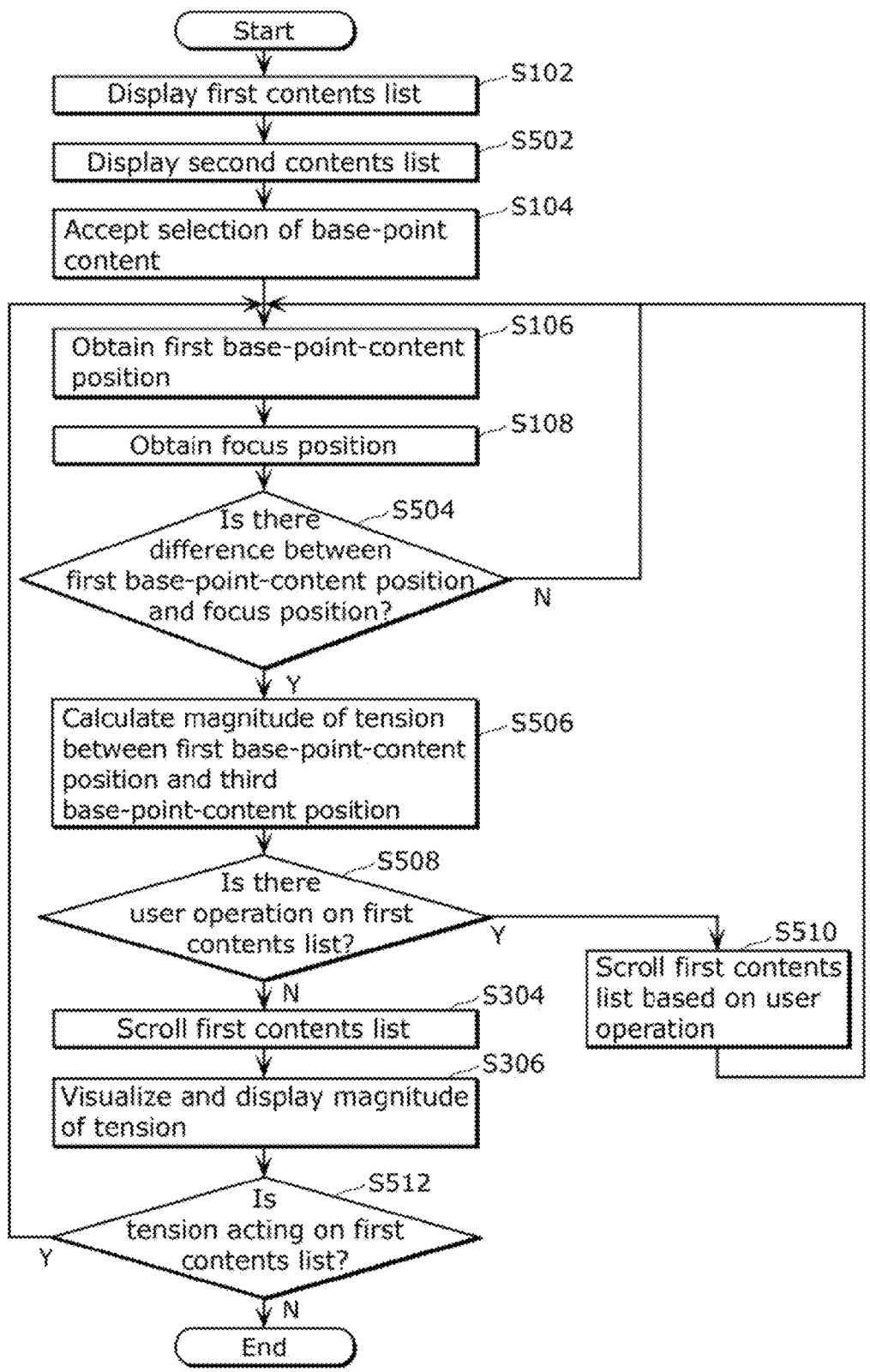
FIG. 16 is a flowchart illustrating an example of a process performed by the display control device in the fifth embodiment of the present invention.

FIG. 16 is a flowchart illustrating an example of a process performed by the display control device 500 in the fifth embodiment of the present invention.

Figure 17:
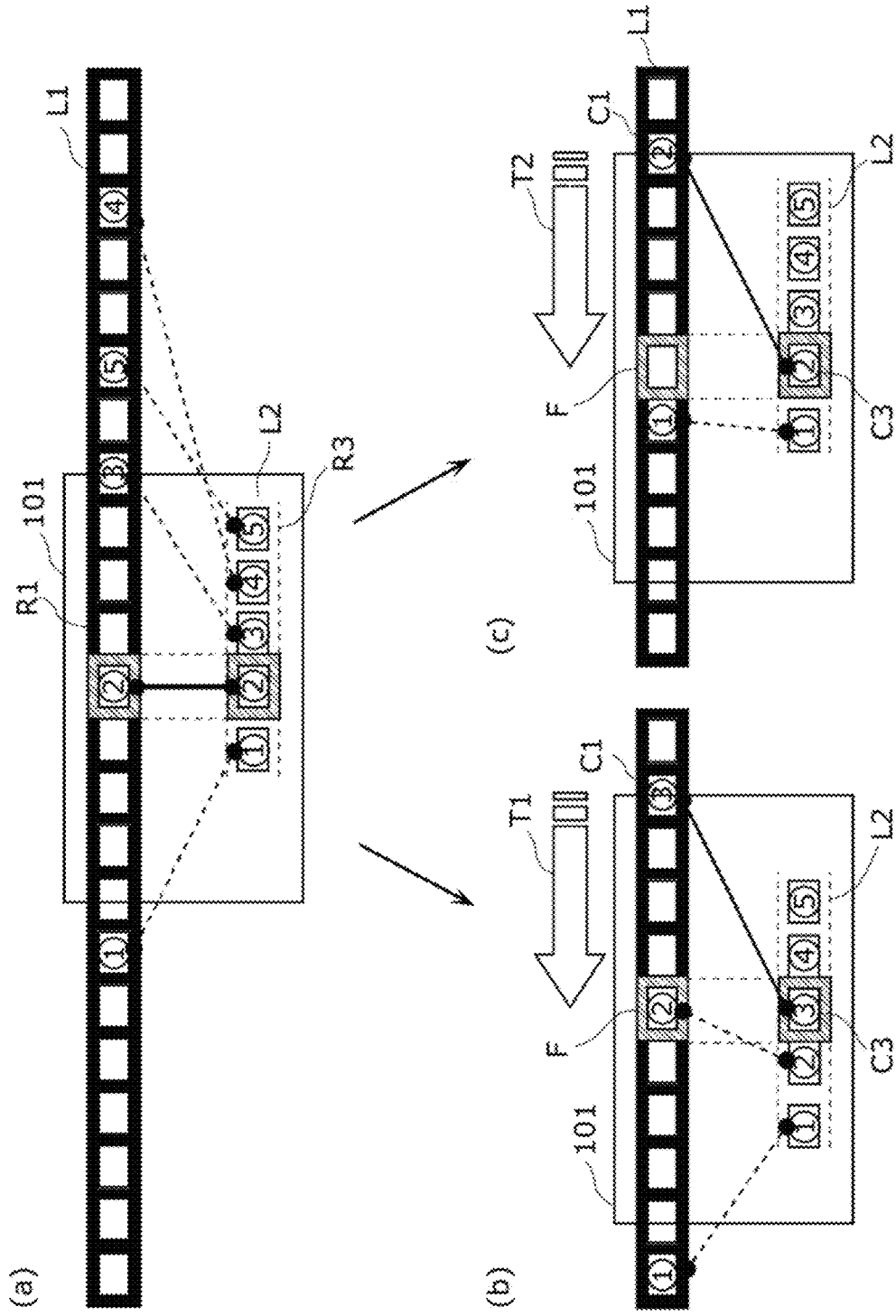
FIG. 17 is a diagram illustrating a process performed by the display control device in the fifth embodiment of the present invention.
Figure 18:
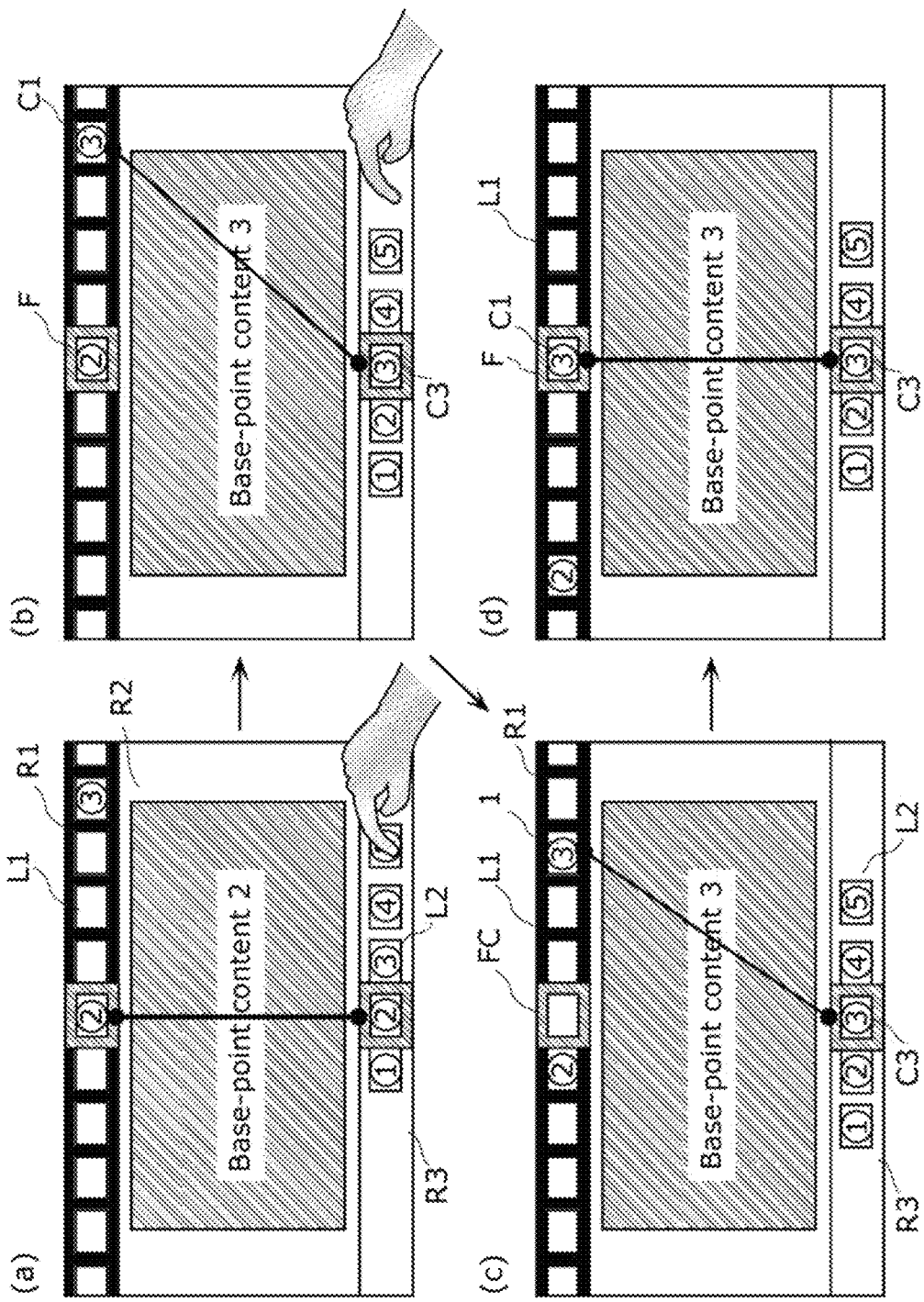
FIG. 18 is a diagram illustrating a process performed by the display control device in the fifth embodiment of the present invention.

FIGS. 17 and 18 are diagrams illustrating processes performed by the display control device 500 in the fifth embodiment of the present invention.

As illustrated in FIG. 16, first the first-contents-list displaying unit 160 displays a first contents list on a display screen 101 (S102). The second-contents-list displaying unit 510 displays a second contents list, which is a list of contents that are candidates for the base-point content, in a region on the display screen 101 that is different from the region where the first contents list is displayed (S502).

Specifically, as illustrated in (a) of FIG. 17, the first-contents-list displaying unit 160 displays the first contents list L1 in a first layer R1 on the display screen 101 while the second-contents-list displaying unit 510 displays the second contents list L2 in a third layer R3. Here, the second contents list L2 represents a list of contents selected by a user as candidates for the base-point content from the first contents list L1 and arranged in the order in which the contents were selected. Here, contents 1 to 5 on the first contents list L1 correspond to contents 1 to 5 arranged on the second contents list L2.

In FIG. 16, the process from accepting selection of a base-point content on the first contents list by the base-point-content selecting unit 110 (S104) to obtaining the focus position by the focus position obtaining unit 130 (S108) is the same as the process performed by the display control device 100 in the first embodiment described above (S104 through S108 in FIG. 3) and therefore detailed description of that part of the process will be omitted.

As illustrated in FIG. 16, the positional difference calculating unit 520 determines whether or not there is a positional difference between the base-point-content position and the focus position (S504). When the positional difference calculating unit 520 determines that there is not a positional difference (N at S504), the process returns to S106.

When the positional difference calculating unit 520 determines that there is a positional difference (Y at S504), the tension calculating unit 521 calculates the magnitude of tension associated with a distance between the third base-point-content position and the first base-point-content position (S506). Specifically, when a content 3, for example, is selected as illustrated in (b) of FIG. 17, the tension calculating unit 521 calculates the magnitude of tension associated with the distance between a first base-point content position C1 of the third content 3 and a third base-point-content position C3 of the base point content 3.

That is, (b) of FIG. 7 represents a transition state that appears when the user changes the base-point content from one content to another by performing a scroll operation on the second contents list L2 in the state in (a) of FIG. 17 or by directly designating a content. Here, the content that is the base-point content for the first contents list L1 is changed from base-point content 2 to base-point content 3.

In the state in (b) of FIG. 17, there is a difference between the first base-point-content position C1 of the base-point content 3 and the focus position F on the first contents list L1 and tension T1 that apparently pulls the base-point content 3 toward the focus position F acts on the first contents list L1.

Note that the third base-point-content position C3 is a position of a base-point content selected on the second contents list L2 and whose positional difference from the first base-point-content position C1 corresponds to a positional difference between the first base-point-content position C1 and the focus position F. That is, the horizontal positional difference between the first base-point-content position C1 and the third base-point-content position C3 is equal to the horizontal positional difference between the first base-point-content position C1 and the focus position F in (b) of FIG. 17.

Part (c) of FIG. 17 represents a transition state that appears when the user performs a scroll operation on the first contents list L1 in the state in (a) of FIG. 17. Here, the first contents list L1 is scrolled by four contents rightward. In this state, there is a difference between the first base-point-content position C1 of the base-point content 2 and the focus position F on the first contents list L1, and tension T2 that apparently pulls the base-point content 2 toward the focus position F acts on the first contents list L1.

Returning to FIG. 16, the first scrolling unit 150 determines whether or not there is a user operation on the first contents list (S508). When the first scrolling unit 150 determines that there is a user operation on the first contents list (Y at S508), the first scrolling unit 150 scrolls the first contents list on the basis of the user operation (S510) and then the process returns to S106.

When the first scrolling unit 150 determines that there is not a user operation on the first contents list (N at S508), the first scrolling unit 150 scrolls the first contents list so that tension calculated by the tension calculating unit 521 decreases in accordance with a virtual restoring force of the tension (S304). That is, in (b) of FIG. 17, the first contents list L1 is scrolled so that the base-point content 3 moves to the focus position F; in (c) of FIG. 17, the first contents list L1 is scrolled so that the base-point content 2 moves to the focus position F.

The tension displaying unit 320 visualizes and displays the magnitude of the tension on the display screen 101 (S306).

The display control device 500 then determines whether or not tension is acting on the first contents list (S512). When the display control device 500 determines that the tension is acting (V at S512), the process returns to S106; when the display control device 500 determines the tension is not acting (N at S512), the process ends.

The display control device 500 does not need to perform all of the process illustrated in FIG. 16. At least one of S504, S508, S510 and S512 of the process may be omitted.

In an example in FIG. 18, the screen is configured in such a way that a first contents list L1, which is a list of shot and obtained contents, is displayed in a first layer R1, a base-point content selected by a user is displayed in a second layer R2, and a second contents list L2, which is a list of contents that are candidates for the base-point content selected by a user from the first contents list L1 is displayed in a third layer R3.

A user operation and screen transition in the example in FIG. 18 are as follows. For example, the user scrolls the second contents list L2 displayed in the third layer R3 as illustrated in (a) and (b) of FIG. 18 to select and change a base-point content. Then the first contents list L1 displayed in the first layer R1 is controlled to scroll so that the first base-point content position C1 moves to the focus position F as illustrated in (c) to (d) of FIG. 18 unless the user subsequently performs an operation.

In the example in FIG. 18, a rubber cord that links between the first base-point-content position C1 on the first contents list L1 displayed in the first layer R1 and the third base-point-content position C3 on the second contents list L2 displayed in the third layer R3 represents tension acting on the first contents list L1.

As has been descried above, according to the display control device 500 in the fifth embodiment of the present invention, the tension calculating unit 521 calculates the magnitude of tension associated with the distance between the third base-point-content position of a base-point content selected on the second contents list and the first base-point-content position as a positional difference and the first scrolling unit 150 scrolls the first contents list so that the tension decreases in accordance with a virtual restoring force of the tension. That is, the display control device 500 virtually represents the positional difference between the third base-point-content position and the first base-point-content position as tension and scrolls the first contents list so that the tension decreases. Consequently, scroll control of a contents list with a content selected by the user as the base-point content as the base point can be performed by using tension, which is a representation intuitive to the user.

The display control device 500 visualizes and displays the magnitude of tension between the third base-point-content position and the first base-point-content position on the display screen by the tension displaying unit 320. That is, since the magnitude of the tension is visualized and displayed, the positional difference between the third base-point-content position and the first base-point-content position can be visually known. Consequently, scroll control of a contents list with a content selected by the user as the base-point content as the base point can be visually performed.

(Sixth Embodiment)

A display control device 600 in a sixth embodiment of the present invention will be described next.

Figure 19:
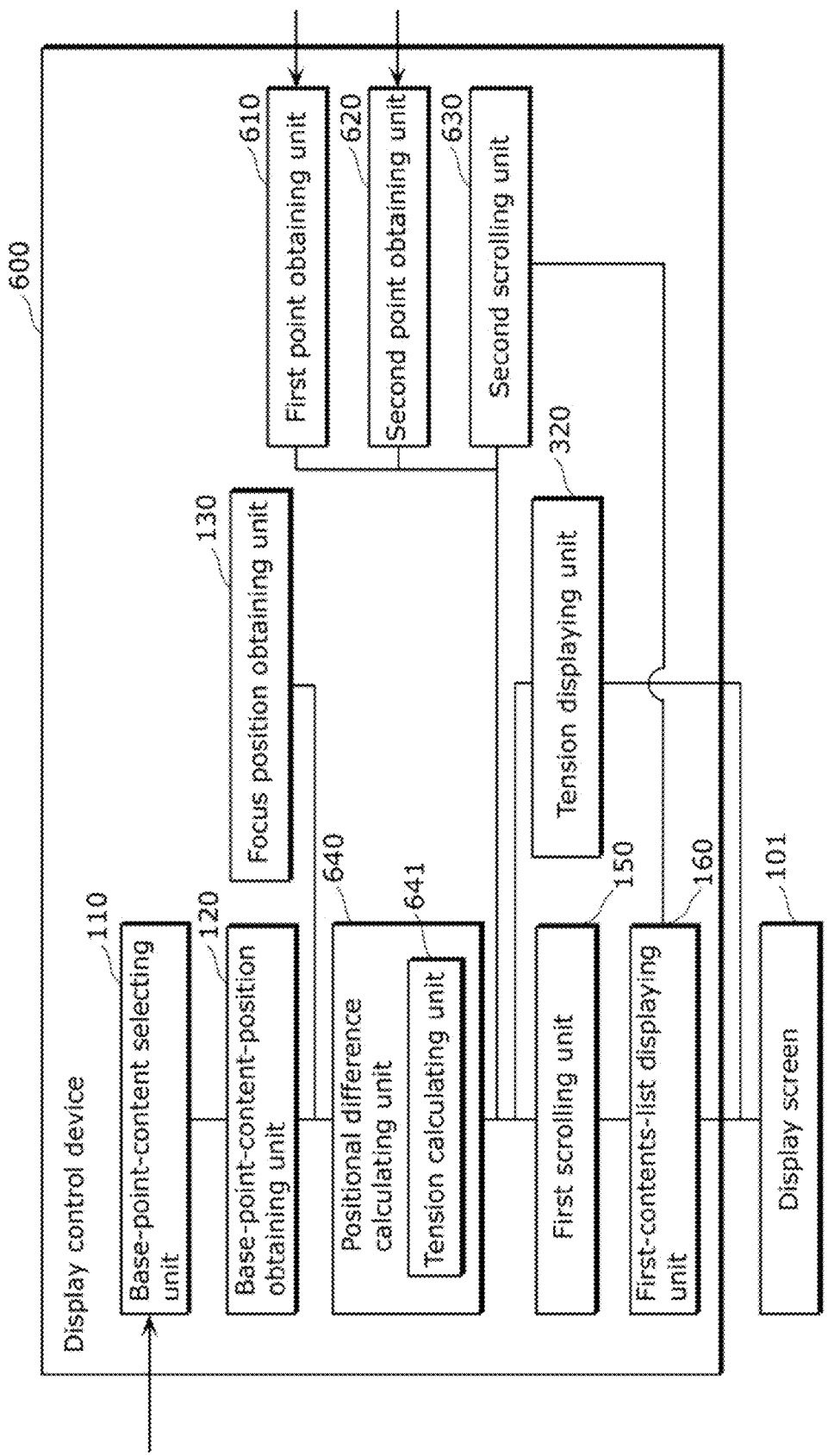
FIG. 19 is a block diagram illustrating a functional configuration of a display control device in a sixth embodiment of the present invention.

FIG. 19 is a block diagram illustrating a functional configuration of the display control device 600 in the sixth embodiment of the present invention.

As illustrated in FIG. 19, the display control device 600 includes a base-point content selecting unit 110, a base-point-content-position obtaining unit 120, a focus position obtaining unit 130, a first point obtaining unit 610, a second point obtaining unit 620, a second scrolling unit 630, a positional difference calculating unit 640, a first scrolling unit 150, a first-contents-list displaying unit 160, and a tension displaying unit 320.

The base-point-content selecting unit 110, the base-point-content-position obtaining unit 120, the focus position obtaining unit 130, the first scrolling unit 150 and the first-contents-list displaying unit 160 are the same as the equivalent units of the display control device 100 in the first embodiment descried above and therefore detailed description of those units will be omitted here. The tension displaying unit 320 has the same function as the tension displaying unit 320 of the display control device 300 in the third embodiment and therefore detailed description of the tension displaying unit 320 will be omitted.

The first point obtaining unit 610 accepts designation of a first point position, which is the position of a first point on a display screen 101. For example, the first point obtaining unit 610 accepts designation of the first point position in response to a user operation on the display screen 101.

The second point obtaining unit 620 accepts designation of a second point position, which is the position of a second point on the display screen 101. For example, the second point obtaining unit 620 accepts the second point position in response to a user operation on the display screen 101.

The second scrolling unit 630 scrolls the first contents list so that a positional difference between the first base-point-content position and the focus position corresponds to a positional difference between the first point position and the second point position.

The positional difference calculating unit 640 includes a tension calculating unit 641. The tension calculating unit 641 calculates, as a positional difference between the first base-point-content position and the focus position, the magnitude of tension virtually produced between the first base-point-content position and the focus position in association with the distance between the first base-point-content position and the focus position.

The first scrolling unit 150 scrolls the first contents list to decrease the positional difference between the first base-point-content position and the focus position when the first point obtaining unit 610 no longer accepts designation of the first point position or when the second point obtaining unit 620 no longer accepts designation of the second position. The first scrolling unit scrolls the first contents list so that the tension decreases in accordance with a virtual restoring force of the tension.

The tension displaying unit 320 visualizes and displays the magnitude of tension on a display screen 101. The tension displaying unit 320 represents and displays the tension as a virtual rubber cord or a spring. The tension displaying unit 320 displays the tension between the first base-point-content position and the second base-point-content position.

Figure 20:
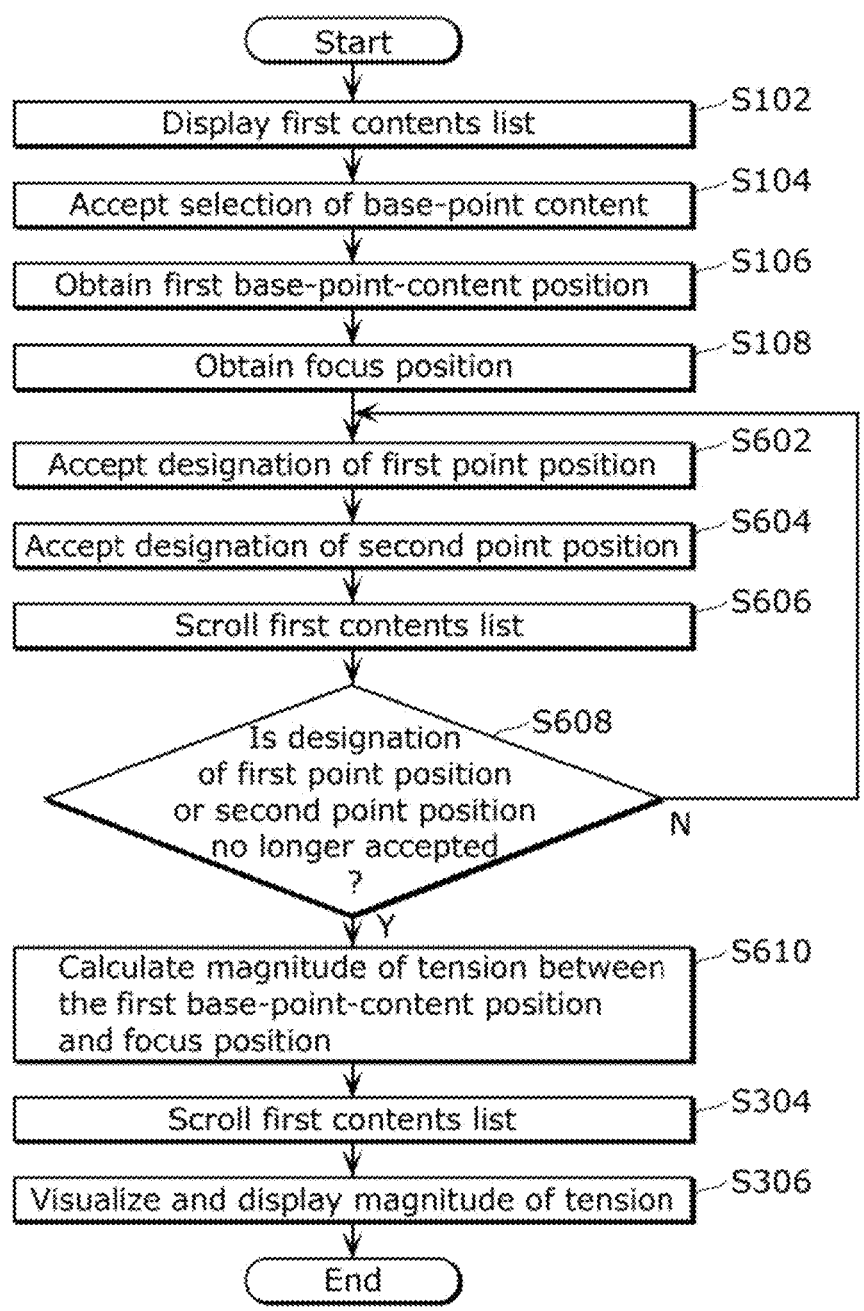
FIG. 20 is a flowchart illustrating an example of a process performed by the display control device in the sixth embodiment of the present invention.

FIG. 20 is a flowchart illustrating an example of a process performed by the display control device 600 in the sixth embodiment of the present invention.

Figure 21:
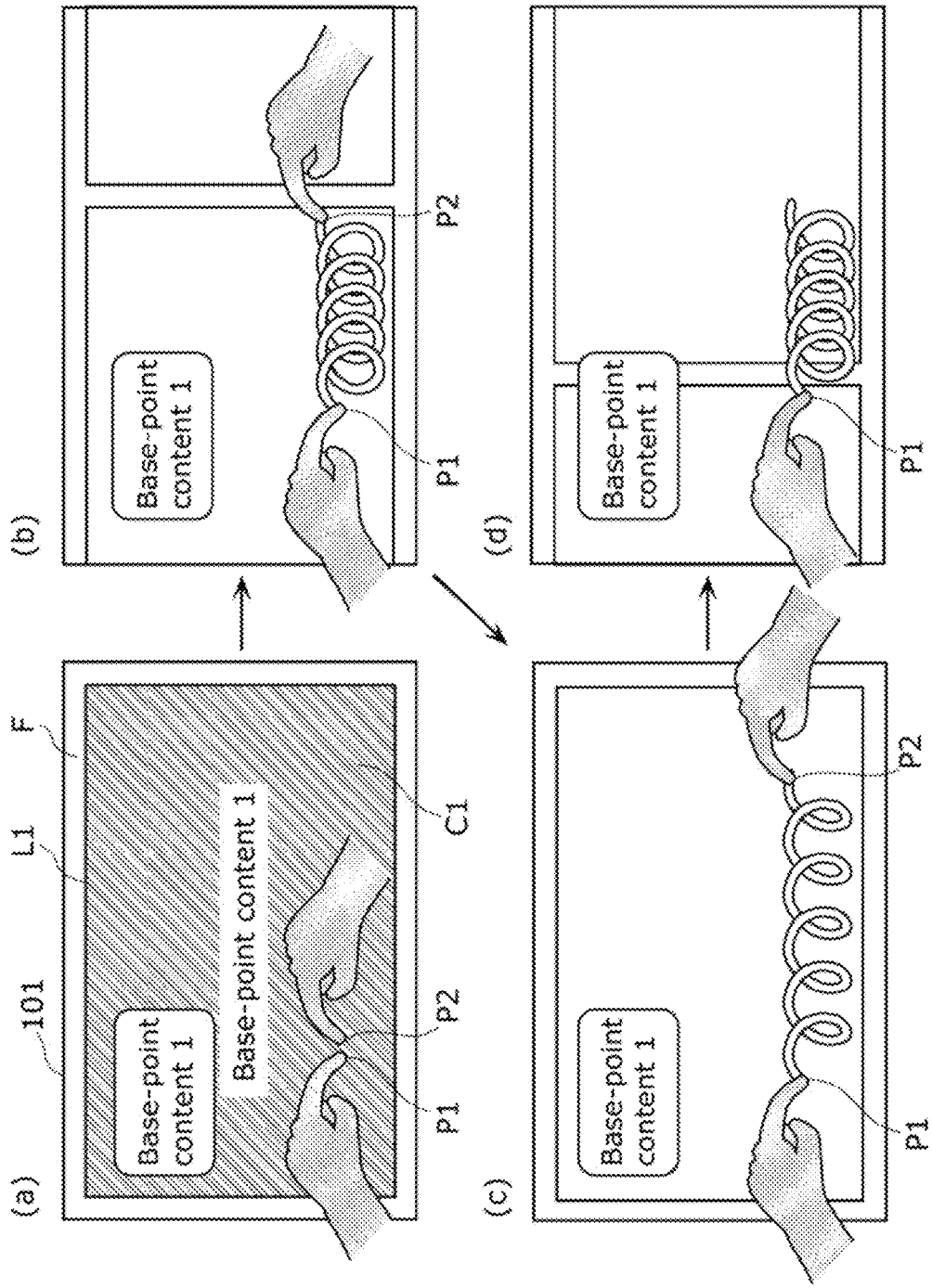
FIG. 21 is a diagram illustrating a process performed by the display control device in the sixth embodiment of the present invention.
Figure 22:
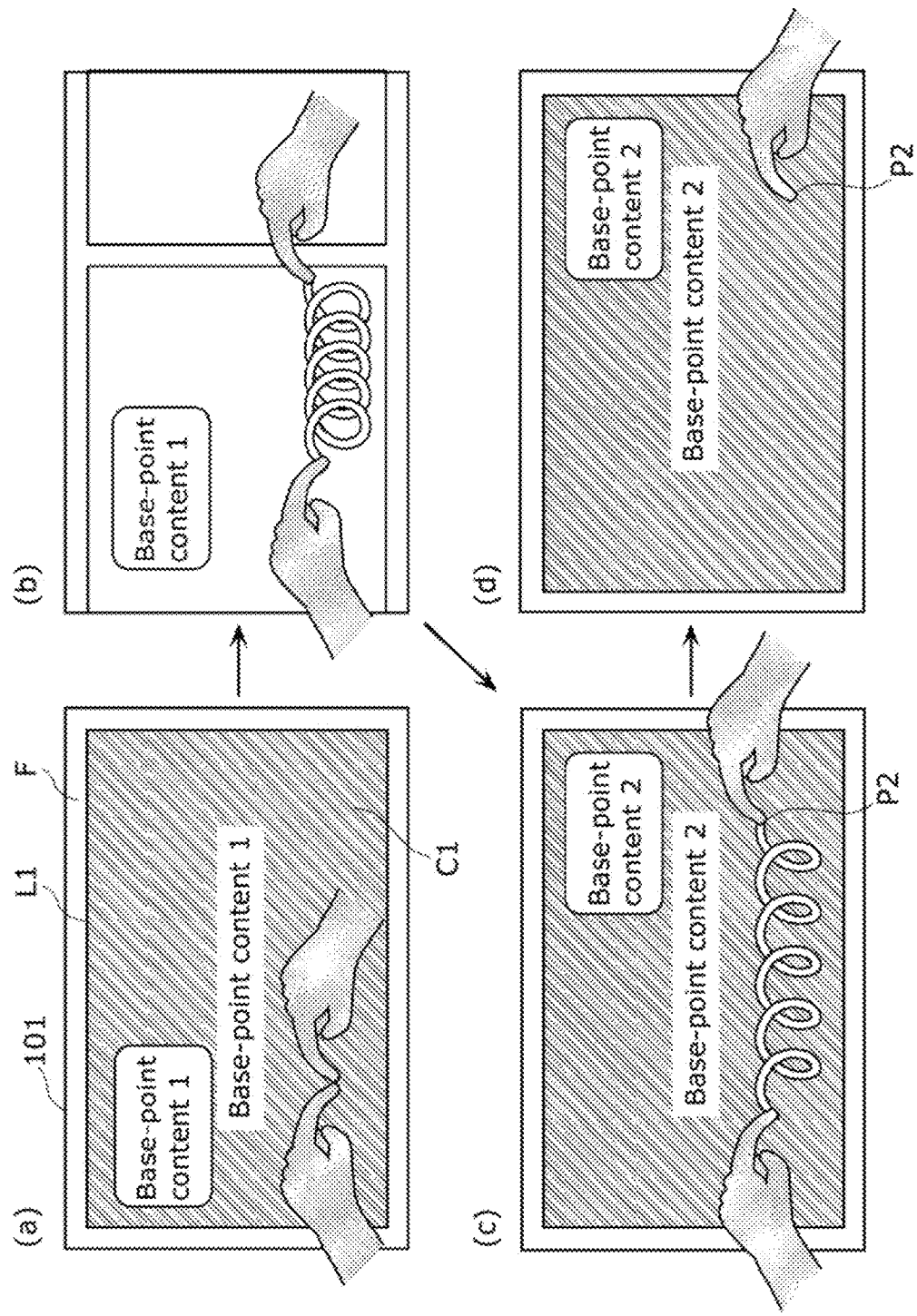
FIG. 22 is a diagram illustrating a process performed by the display control device in the sixth embodiment of the present invention.

FIGS. 21 and 22 are diagrams illustrating processes performed by the display control device 600 in the sixth embodiment of the present invention.

In FIG. 20, the process from displaying the first contents list on the display screen 101 by the first-contents-list displaying unit 160 (S102) to obtaining the focus position by the focus position obtaining unit 130 (S108) is the same as the process performed by the display control device 100 in the first embodiment described above (S102 through S108 in FIG. 3) and therefore detailed description of that part of the process will be omitted here.

As illustrated in FIG. 20, the first point obtaining unit 610 accepts designation of a first point position on the display screen 101 (S602).

The second point obtaining unit 620 accepts designation of a second point position on the display screen 101 (S604).

The second scrolling unit 630 scrolls the first contents list so that a positional difference between the first base-point-content position and the focus position corresponds to a positional difference between the first point position and the second point position (S606).

For example, the user selects a base-point content 1 and points a first point position P1, which serves as a fiducial point on the screen, with a finger of one hand (left hand) as illustrated in (a) of FIG. 21. The user then slides a finger of the other hand (right hand) from the fiducial point to point a second point position P2 as illustrated in (a) to (c) of FIG. 21. This scrolls the first contents list L1 so that the positional difference between the first point position P1 and the second point position P2, which is the positional difference between positions pointed to with the two fingers, corresponds to the positional difference between the first base-point-content position C1 and the focus position F on the first contents list L1 (the central position of the screen).

Returning to FIG. 20, the positional difference calculating unit 640 determines whether or not the first point obtaining unit 610 no longer accepts designation of the first point position or the second point obtaining unit 620 no longer accepts designation of the second point position (S608). When the positional difference calculating unit 640 determines that designation of the first point position and the second point position is still being accepted (N at S608), the process returns to S602.

When the positional difference calculating unit 640 determines that designation of the first position point or the second point position is no longer accepted (Y at S608), the tension calculating unit 641 calculates the magnitude of tension associated with the distance between the first base-point content position and the focus position (S610).

The first scrolling unit 150 scrolls the first contents list so that the positional difference between the first base-point-content position and the focus position decreases (S304). That is, the first scrolling unit scrolls the first contents list so that the tension decreases in accordance with a virtual restoring force of the tension. The tension displaying unit 320 visualizes and displays the magnitude of the tension on the display screen 101 (S306).

Specifically, as illustrated in (c) to (d) of FIG. 21, when the user releases the finger of the other hand (right hand) from the touch panel, the first contents list L1 is controlled to scroll so that the first base-point-content position C1 moves to the focus position F. Here, a spring or the like is displayed between the positions pointed to with the fingers to make the process of the operation readily recognizable to the user. In addition, the currently selected base-point content is popped up or otherwise displayed on the display screen 101 to make the base-point content readily recognizable to the user.

An example in FIG. 22 illustrates a process for a user to flexibly change base-point contents. The process in (a) to (c) of FIG. 22 is the same as the process in (a) to (c) of FIG. 21, except that when the user releases a finger of one hand (left hand) with which the user has pointed to a fiducial point, the fiducial point is switched to a second point position P2 pointed to with a finger of the other hand (right hand) on the screen as illustrated in (c) to (d) of FIG. 22.

In this way, the currently displayed base-point content 2 is selected as the base-point content and the first contents list L1 is controlled to scroll so that the new first base-point-content position C1 moves to the focus position F. Here, the position of a base-point content displayed through a pop-up or other way on the display screen 101 is changed according to the operation to make the change of base-point contents readily recognizable to the user.

The graphics of springs in FIGS. 21 and 22 are not limited to the examples depicted. For example, the magnitude of tension may be represented as a spring that is different from the depicted springs in the number of winds, thickness, size, or shape or may be represented as a rubber cord that changes in thickness as it stretches.

Furthermore, the position of the spring is not limited to the examples depicted in FIGS. 21 and 22. The spring may be displayed in any position on the screen. That is, while each of the springs in FIGS. 21 and 22 are displayed in such a way that the starting point or end point of the spring coincides with a finger of the left or right hand, the position is not so limited. For example, the spring may be displayed in such a way that the starting point or end point of the spring is displayed at a predetermined distance from the position of a finger of the hand.

As has been described above, according to the display control device 600 in the sixth embodiment of the present invention, the second scrolling unit 630 scrolls the first contents list so that a positional difference between the first base-point-content position and the focus position corresponds to a positional difference between the first point position and the second point position and, when designation of the first point position or the second point position is no longer accepted, scrolls the first contents list so that the positional difference decreases. That is, the first contents list is scrolled in response to acceptance of designation of the first point position or the second point position and, when the first point position or the second point position is no longer designated, the first contents list is scrolled so that the positional difference decreases. Accordingly, the first contents list can be flexibly scrolled with two fingers, for example, and after the scrolling, the first contents list can be scrolled with a content selected by the user as the base point.

When designation of the first point position or the second point position is no longer accepted, the tension calculating unit 641 calculates the magnitude of tension associated with the distance between the first base-point content position and the focus position as a positional difference and the first scrolling unit 150 scrolls the first contents list so that the tension decreases in accordance with a virtual restoring force of the tension. That is, the display control device 600 uses a virtual tension to represent a positional difference between the first base-point content position and the focus position after scrolling of the first contents list caused by designation of the first point position and the second point position, and scrolls the first contents list so that the tension decreases. Thus, scroll control of a contents list with a content selected by the user as the base-point content as a base point can be performed by using tension, which is a representation intuitive to the user.

Furthermore, in scrolling of the first contents list by the first scrolling unit 150 and the second scrolling unit 630, the display control device 600 visualizes and displays the magnitude of tension between the first base-point-content position and the focus position on the display screen 101 by the tension displaying unit 320. That is, since the magnitude of the tension is visualized and displayed, the positional difference between the content displayed at the focus position and the base-point-content position can be visually known. Consequently, scroll control of a contents list with a content selected by the user as the base-point content as the base point can be visually performed.

(Seventh Embodiment)

A display control device 700 in a seventh embodiment of the present invention will be described next. While the first to sixth embodiments have been described with user operations and screen transitions on a touch panel, user operations and screen displays are not limited to user operations and screen displays on a touch panel. For example, a screen display may be provided on a screen of a television set or a personal computer and user operations may be performed with a remote control or a keyboard. Alternatively, a screen display may be provided on a screen of a television set or a personal computer and user operations and a separate screen display may be performed and provided on a tablet or a mobile terminal linked to the television set or the personal computer.

Figure 23:
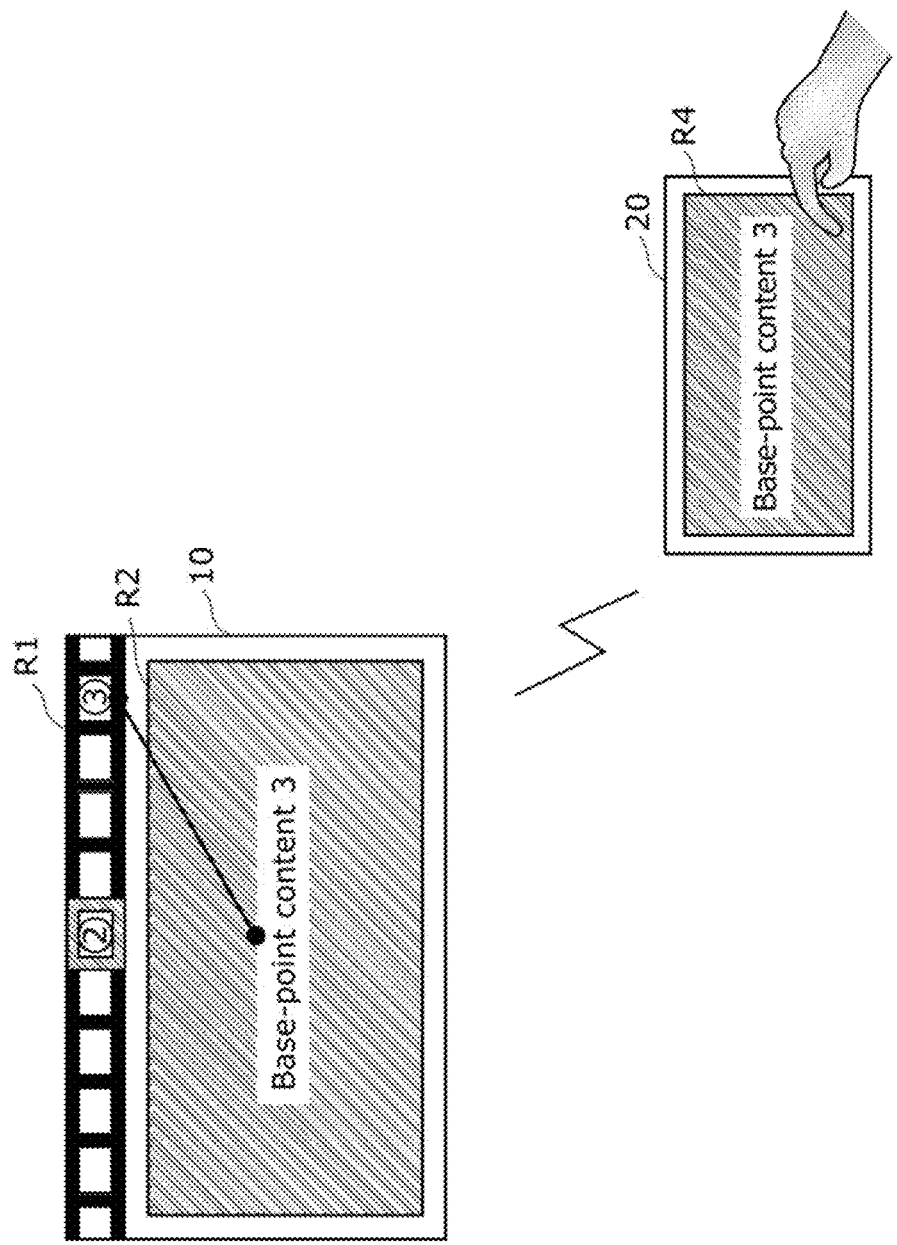
FIG. 23 is a diagram illustrating a display control device in a seventh embodiment of the present invention.

FIG. 23 is a diagram illustrating the display control device 700 in the seventh embodiment of the present invention.

Specifically, FIG. 23 illustrates an example of a user operation and a screen display in a case where a screen display equivalent to the example in FIG. 13 is provided on a screen of a display-equipped device 10 such as a television set or a personal computer, a screen display is caused to be provided in a second layer R2 of the display-equipped device 10 from an operation device 20 such as a tablet or a mobile terminal remotely linked to the television set or the personal computer, and a user operation on the screen display is performed from the operation device 20.

Here, the display-equipped device 10 includes a display control device 700 of the seventh embodiment of the present invention. The display control device 700 includes processing units such as the base-point-content selecting unit 110 in the embodiment described above.

The base-point-content selecting unit 110 receives information identifying a base-point content from an operation device 20, which is another device, to receive selection of the base-point content identified by the information.

Specifically, as illustrated in FIG. 23, screen displays equivalent to the first layer R1 and the second layer R2 in the example in FIG. 13 are displayed in a first layer R1 and a second layer R2, respectively, of the display-equipped device 10. A fourth layer R4 of a touch panel screen of the operation device 20, which is a tablet, a mobile terminal or the like at hand of a user, shares a screen display with the second layer R2 on the display-equipped device 10. When the user performs an operation in the fourth layer R4 of the touch panel of the operation device 20, the operation and a screen transition caused by that operation are remotely reflected in the second layer R2 of the screen of the display-equipped device 10.

As has been described above, according to the display control device 700 in the seventh embodiment of the present invention, the base-point-content selecting unit 110 receives information identifying a base-point content from the operation device 20, which is another device, to accept selection of the base-point content identified by the information. That is, when the user operates the operation device 20 to send information identifying a base-point content to the display control device 700, the display control device 700 receives the information to accept selection of the base-point content identified by the information. In this way, a list of contents displayed on a device such as a big-screen television set can be controlled to scroll by the display control device 700 through an operation performed on a tablet, a mobile terminal or the like by the user.

Note that the display-equipped device 10 may be a server displaying a contents list on which contents on a cloud (cloud computing) are arranged and contents on the cloud may be operated from an operation device 20 that is a local terminal.

The display-equipped device 10 does not need to include all of the functions of the display control device 700. Some or all of the functions of the display control device 700 may be included in the operation device 20.

(Other Embodiments)

While the scroll control in the case where the base-point-content position on the contents list is different from the focus position is based on tension in the embodiments described above, the scroll control in that case is not limited to this.

For example, a contents list may be controlled to scroll so that the base-point content moves to the focus position in a constant time regardless of the magnitude of a positional difference between the base-point-content position and the focus position on the contents list.

That is, the first scrolling unit 150 scrolls the first contents list so that the positional difference decreases to a predetermined magnitude in a constant time regardless of the magnitude of the positional difference. In this way, the first scrolling unit 150 can control the speed of scrolling of the first contents list independently of the magnitude of the positional difference.

Furthermore, the contents list may be controlled to scroll so that the base-point content moves to the focus position at the same speed.

For example, the first scrolling unit 150 scrolls the first contents list so that the positional difference decreases to a predetermined magnitude in a time corresponding to the magnitude of the positional difference. For example, the greater the positional difference, the longer the time in which the first scrolling unit 150 scrolls the first contents list. In this way, the speed of scrolling of the first contents list can be controlled according to the magnitude of the positional difference.

Furthermore, the first scrolling unit 150 may scroll the first contents list so that the positional difference decreases to a predetermined magnitude in a time corresponding to the number of contents existing between the first base-point-content position and the focus position. For example, the greater the number of the contents, the longer the time in which the first scrolling unit 150 scrolls the first contents list. In this way, the speed of scrolling of the first contents list can be controlled according to the number of the contents.

Furthermore, scroll control may be performed in accordance with a difference between the time instant at which the base-point content on the contents list was shot/obtained and the time instant at which the content existing at the focus position was shot/obtained. That is, the first scrolling unit 150 scrolls the first contents list so that the positional difference decreases to a predetermined magnitude in a time corresponding to the relationship between the time instant associated with the base-point content and the time instant associated with the content existing at the focus position. In this way, the speed of scrolling of the first contents list can be controlled according to the time instants associated with contents.

Furthermore, while the lists of contents are displayed along a horizontal axis and scroll operations are performed leftward and rightward in the embodiments described above, the display of lists of contents and scroll operations are not so limited.

Figure 24:
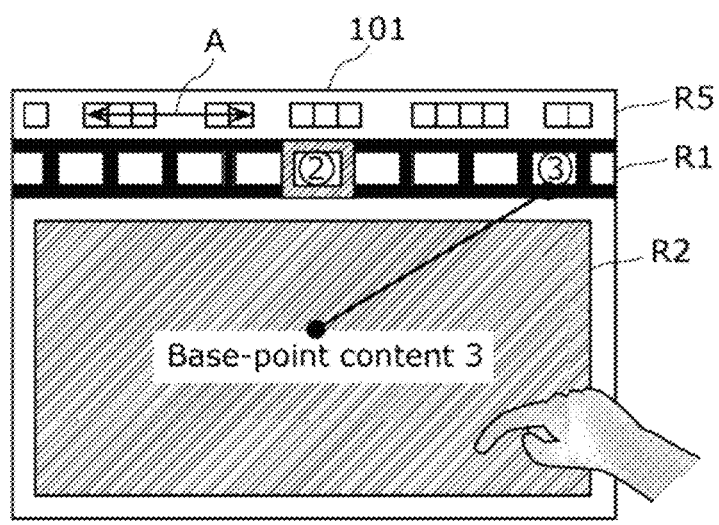
FIG. 24 is a diagram illustrating a display control device in another embodiment of the present invention.

Furthermore, while the first layer R1 in which the first contents list L1 is displayed and the second layer R2 in which the base-point content is displayed are provided on the display screen 101 in FIG. 13, for example, in the description of the embodiments, the configuration of the layers are not so limited. For example, a fifth layer R5 indicating the position of a content displayed on the display screen 101 may be provided on the display screen 101 as illustrated in FIG. 24. FIG. 24 is a diagram illustrating a display control device in another embodiment of the present invention. The location of a content on the first contents list L1 displayed on the display screen 101 is indicated by location A in the fifth layer R5 in FIG. 24.

The way of presenting screen display and the way of performing operations are not limited to the ways in the embodiments described above. For example, the size or shape and the like of a content display may be different from the modes in the embodiments described above.

Furthermore, the first contents list L1 in the description of the embodiments represents a list on which shot and obtained contents are arranged in the order in which the contents are shot and obtained. However, the first contents list L1 may be a list on which contents other than the examples described above are arranged. For example, the first contents list L1 may be a list on which contents shared by users by uploading on an SNS (Social Networking Service) or the like are arranged.

Furthermore, the first contents list L1 may be a list on which contents are arranged in any order such as the order in which the contents were shot, the order in which the contents were stored, the order in which the contents were shared, or the order in which the contents were managed by a user according to a predetermined rule.

While it has been assumed above that the base-point content is a content selected by a user from among the contents listed on the first contents list L1, the base-point content may be other content. If some additional information is added to some of the contents on the first contents list L1 beforehand, the base-point content may be any of the contents to which the additional information is added. In that case, the base-point-content selecting unit 110 functions as a base-point-content identifying unit that identifies a base-point content on the basis of the additional information added to the contents without accepting selection by a user. That is, the display control device may have the function of identifying the base-point content on the first contents list regardless of whether selection of a base-point content is accepted or not.

For example, if additional information for identifying contents shared among users by uploading of the contents to an SNS or the like is added to some of the contents stored on a terminal, the first contents list L1 may be a list of the contents stored on the terminal and the base-point content may be a content to which the additional information is added (a content shred among the users). Furthermore, if comment information or evaluation information is added to some of contents shared among users by uploading to an SNS or the like, the first contents list L1 may be a list of the contents shared among the users by uploading to the SNS or the like and the base-point content may be a content to which the comment information or evaluation information is added.

Furthermore, the first contents list L1 in the description of the embodiments is a list on which contents shot and obtained are arranged and the second contents list L2 represents a list on which contents selected by a user from the first contents list L1 are arranged in the order in which the contents were selected. However, the first contents list L1 and the second contents list L2 may be lists on which contents other than the examples described above are arranged.

For example, the first contents list L1 may be a list on which contents before being shared among users are arranged and the second contents list L2 may be a list on which contents after being shared among the users are arranged. Note that the contents before being shared among users are contents stored on a terminal owned by a user and the contents after being shared by the users are contents shared among the users by uploading to an SNS or the like out of the contents stored on the terminal. Furthermore, the first contents list L1 may be a list on which contents shared among the users are arranged and the second contents list L2 may be a list on which contents selected and stored on a terminal by a user from among the contents shared among the users.

Furthermore, the second contents list L2 may be a list on which contents are arranged in any order such as the order in which the contents were shot, the order in which the contents were stored, the order in which the contents were shared, or the order in which the contents were managed by a user according to a predetermined rule.

Figure 25:
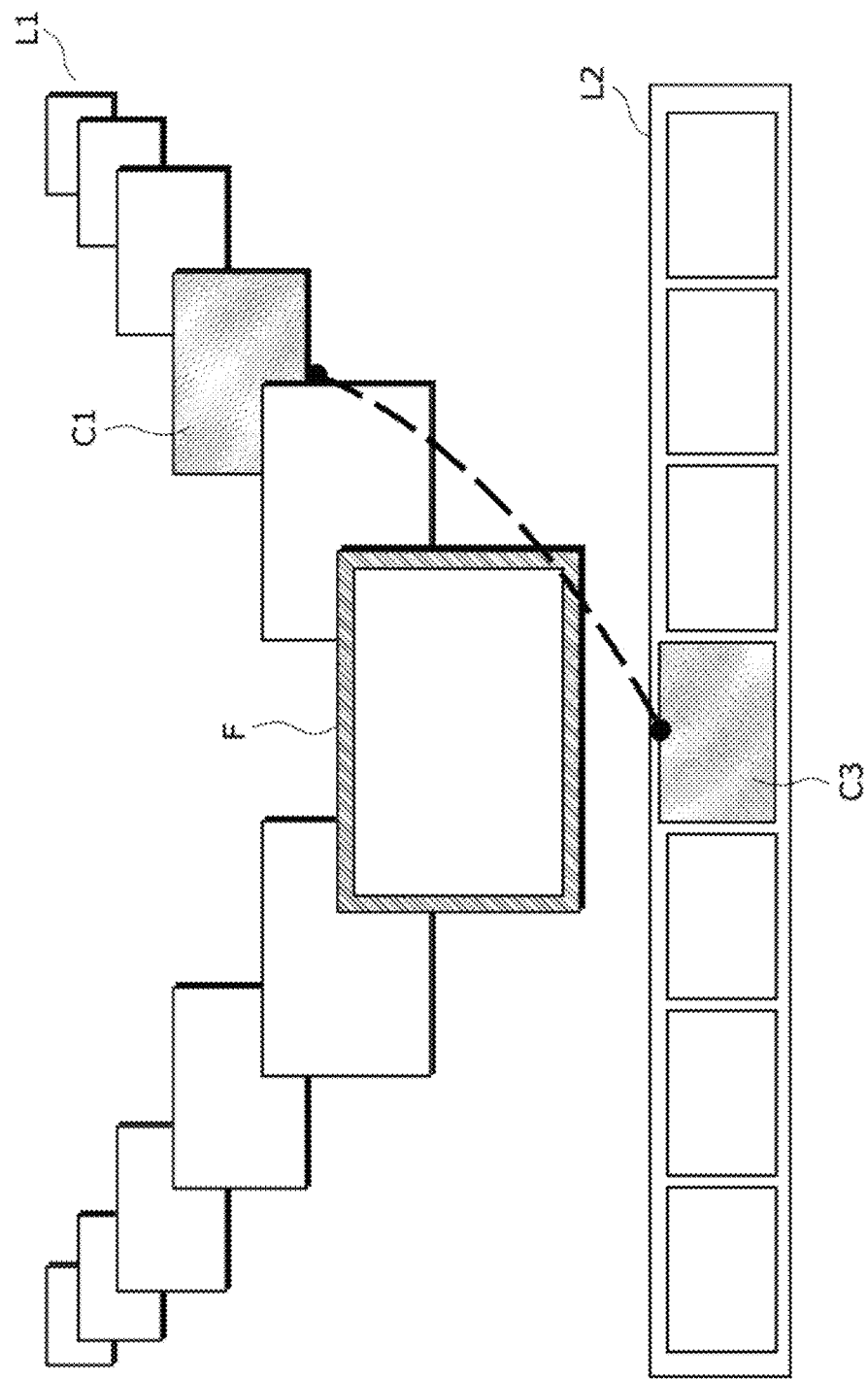
FIG. 25 is a diagram illustrating another example of a display mode of a contents list in an embodiment of the present invention.
Figure 26:
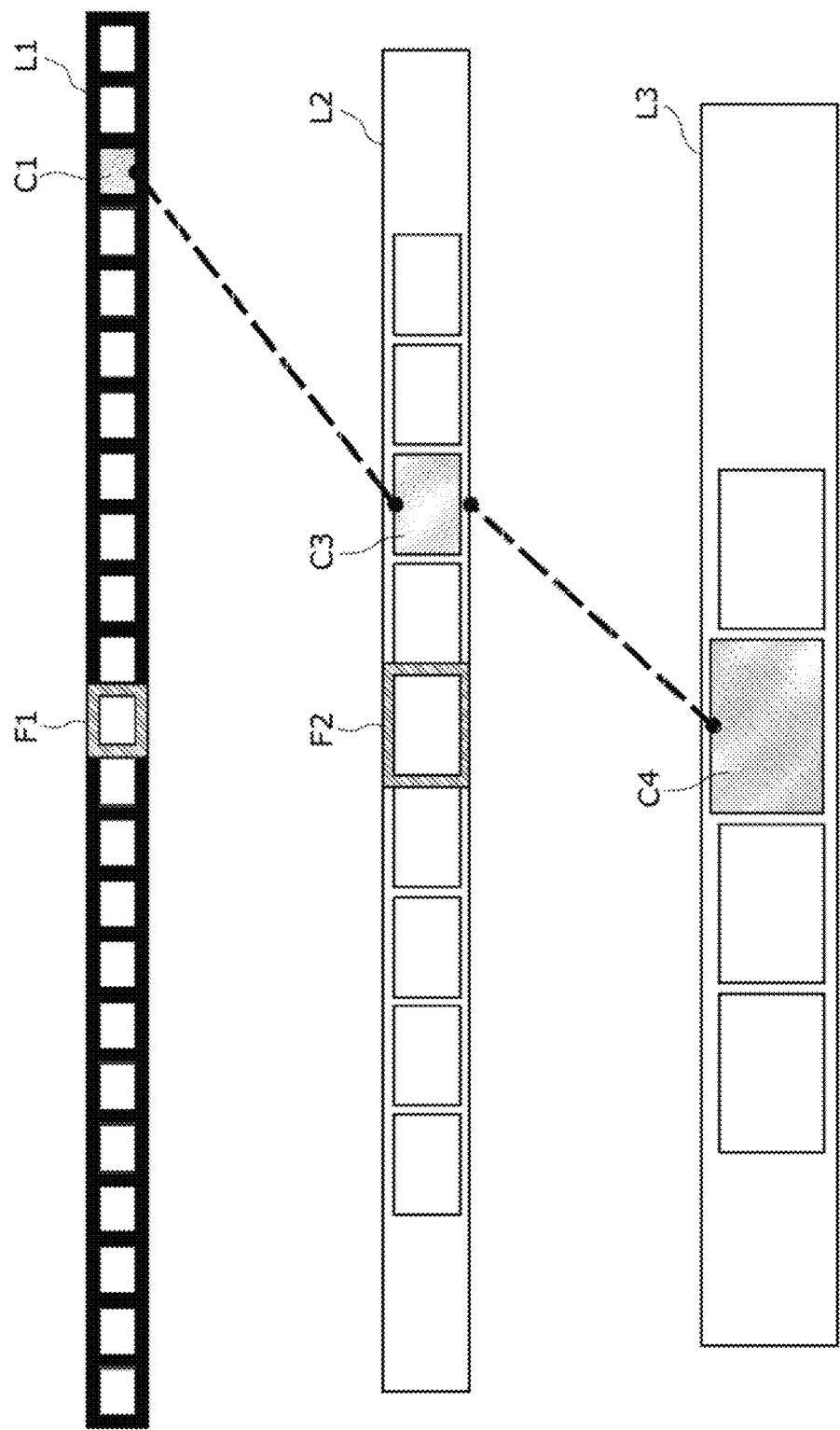
FIG. 26 is a diagram illustrating another example of a display mode of a contents list in an embodiment of the present invention.

Display modes of contents list such as the first contents list L1 and the second contents list. L2 are not limited to those in the embodiments described above. FIGS. 25 and 26 are diagrams illustrating other examples of display modes of contents list in the embodiments of the present invention.

While contents lists such as the first contents list L1 and the second contents list L2 in the description of the embodiments are displayed as lists on which contents are linearly arranged, the contents on a contents list may be in any arrangement such as in the form of an arc, a circle or spirals. For example, the first contents list L1 may be a list of contents arranged in a curve such as a circle, as illustrated in FIG. 25. That is, for example when a content at the third base-point position C3 on the second contents list L2 is selected, the first contents list L1 scrolls so that a content at the first base-point-content position C1 on the first contents list L1 that corresponds to that content approaches the focus position F.

While the contents lists in the description of the embodiments are in one row (the first contents list L1) or two rows (the first contents list L1 and the second contents list L2), contents lists may be in three or more rows. For example, a third contents list L3 may be displayed in addition to the first contents list L1 and the second contents list. L2 as illustrated in FIG. 26. That is, contents selected from the first contents list L1 are arranged on the second contents list L2 and contents selected from the second contents list L2 are arranged on the third contents list L3. When for example a content at a fourth base-point-content position C4 on the third contents list. L3 is selected, the second contents list L2 scrolls so that the content at the third base-point-content position C3 on the second contents list L2 that corresponds to that content approaches the focus position F2. The first contents list L1 scrolls so that the content at the first base-point-content position C1 on the first contents list L1 that corresponds to the content at the third base-point-content position C3 on the second contents list L2 approaches the focus position F1.

Moreover, each of the components in each embodiment may take the form as dedicated hardware or may be implemented by executing a software program suitable for each component. For example, each component may be implemented by, CPU or a program execution unit, such as processor, loading and executing a software program stored in a hard disk or a recording medium such as a semiconductor memory.

That is, the components of the display control device illustrated in FIG. 1, 5, 8, 11, 15 or 19 may be implemented by software. Software that implements the display control device of any of the embodiments described above is a computer program that causes a computer to execute steps included in the following display control method. Specifically, the display control method includes a first-contents-list displaying step of displaying on a display screen a first contents list which is a scrollable list of contents; a base-point-content identifying step of identifying a base-point content on the first contents list; a base-point-content-position obtaining step of obtaining a first base-point-content position which is a position of the base-point content on the first contents list; a focus position obtaining step of obtaining a focus position which is a position on the first contents list and is related to a predetermined region on the first contents list displayed on the display screen; a positional difference calculating step of calculating a positional difference between the obtained first base-point-content position and the obtained focus position; and a first scrolling step of scrolling the first contents list displayed on the display screen so that the positional difference decreases.

In addition, such a program can be distributed by being stored in a storage medium such as CD-ROM via a transmission medium such as the Internet.

Moreover, the present invention may be implemented as an integrated circuit (LSI) that includes the characteristic processing units included in such a display control device. These processing units may separately be mounted on one chip, or a part or the whole of the processing components may be mounted on one chip. Specifically, for example, all the functional blocks included in the display control device illustrated in FIG. 1, FIG. 5, FIG. 8, FIG. 11, FIG. 15, or FIG. 19 may be mounted on one chip.

Here, the term LSI is used. However, IC, system LSI, super LSI, ultra LSI may be used depending on the difference in degree of integration.

Moreover, the circuit integration is not limited to the LSI and may be implemented as a dedicated circuit or a general-purpose processor. An FPGA (Field Programmable Gate Array) which is programmable after manufacturing the LSI, or a reconfigurable processor in which connection or settings of circuit cells in LSI is reconfigurable, may be used.

Furthermore, if circuit integration technology emerges replacing the LSI due to advance in semiconductor technology or other technology derived therefrom, the functional blocks may, of course, be integrated using the technology. Application of biotechnology is possible.

While display control devices according to the present invention have been described with the embodiments described above, the present invention is not limited to these embodiments.

In other words, the embodiments as have been disclosed herein are merely illustrative and should not be interpreted as restrictive. The scope of the present invention is interpreted by the scope of the appended claims rather than by the description set forth above, and includes modifications equivalent to the appended claims and within the scope thereof.

Display control devices according to the present invention enable a scroll operation with an identified content as the base point when a user searches for a content on a contents list and are useful for television sets, personal computers, tablets, mobile terminals and the like that have the function of searching a content on a content list.

REFERENCE SIGNS LIST

10 Display-equipped device
20 Operation device
100, 200, 300, 400, 500, 600, 700 Display control device
101 Display screen
110 Base-point-content selecting unit
120 Base-point-content-position obtaining unit
130 Focus position obtaining unit.
140, 310, 420, 520, 640 Positional difference calculating unit
150 First scrolling unit
160 First-contents-list displaying unit
210 Positional difference displaying unit
311, 421, 521, 641 Tension calculating unit
320 Tension displaying unit
410 Base-point-content displaying unit
510 Second-contents-list displaying unit
610 First point obtaining unit
620 Second point obtaining unit
630 Second scrolling unit

The invention claimed is:
1. A display control device comprising:
a non-transitory memory device storing a program; and
a hardware processor configured to execute the program and cause the display control device to operate as the following units:
a first-contents-list displaying unit configured to display on a display screen a first contents list which is a scrollable list of contents;
a base-point-content identifying unit configured to identify a base-point content on the first contents list;
a base-point-content-position obtaining unit configured to obtain a first base-point-content position which is a position of the base-point content on the first contents list;
a focus position obtaining unit configured to obtain a focus position which is a position on the first contents list and is related to a predetermined region on the first contents list displayed on the display screen;
a positional difference calculating unit configured to calculate a positional difference between the obtained first base-point-content position and the obtained focus position;
a first scrolling unit configured to scroll the first contents list displayed on the display screen so that the positional difference decreases;
a second-contents-list displaying unit configured to display in a region different from the first contents list on the display screen a second contents list which is a list of contents selected as candidates for the base-point content from the first contents list by a user; and
a tension displaying unit configured to visualize and display the magnitude of the tension on the display screen,
wherein the positional difference calculating unit includes a tension calculating unit configured to calculate, as the positional difference, a magnitude of physical tension virtually produced between a third base-point-content position and the first base-point-content position in association with a distance between the third base-point-content position and the first base-point-content position, the third base-point-content position being a position of a base-point-content identified on the second contents list and having a positional difference from the first base-point-content position which corresponds to a positional difference between the first base-point-content position and the focus position,
the first scrolling unit is configured to scroll the first contents list so that the tension decreases in accordance with a virtual restoring force of the tension, and
the first scrolling unit is configured to scroll the first contents list so that the tension decreases in accordance with a virtual restoring force of the tension, and
the tension displaying unit is configured to represent and display the tension as a virtual rubber cord or spring.
2. The display control device according to claim 1,
wherein the tension displaying unit is configured to display the tension, between the first base-point-content position and the focus position.

3. The display control device according to claim 1, further comprising a positional difference displaying unit configured to visualize and display a magnitude of the positional difference on the display screen.

4. The display control device according to claim 3, wherein the positional difference displaying unit is configured to display the magnitude of the positional difference by making the magnitude of the positional difference correspond to at least one of a length of a line, a thickness of a line, a shade of a color, an arrow, and a number.

5. The display control device according to claim 1, further comprising a base-point-content displaying unit configured to display the base-point content in a region different from the first contents list on the display screen,
wherein the positional difference calculating unit includes a tension calculating unit configured to calculate, as the positional difference, a magnitude of physical tension virtually produced between a second base-point-content position and the first base-point-content position in association with a distance between the second base-point-content position and the first base-point-content position, the second-base-point position being a position of a base-point content displayed by the base-point-content displaying unit and having a positional difference from the first base-point-content which corresponds to a positional difference between the first base-point-content position and the focus position; and
the first scrolling unit is configured to scroll the first contents list so that the tension decreases in accordance with a virtual restoring force of the tension.

6. The display control device according to claim 1, further comprising:
a first point obtaining unit configured to accept designation of a first point position which is a position of a first point on the display screen;
a second point obtaining unit configured to accept designation of a second point position which is a position of a second point on the display screen; and
a second scrolling unit configured to scroll the first contents list so that a positional difference between the first base-point-content position and the focus position corresponds to a positional difference between the first point position and the second point position,
wherein the first scrolling unit is configured to scroll the first contents list when the first point obtaining unit completes obtaining a designation of the first point position or when the second point obtaining unit completes obtaining a designation of the second point position.

7. The display control device according to claim 1, wherein the first scrolling unit is configured to scroll the first contents list so that the positional difference decreases to a predetermined magnitude in a constant time regardless of a magnitude of the positional difference.

8. The display control deice according to claim 1, wherein the first scrolling unit is configured to scroll the first contents list so that the positional difference decreases to a predetermined magnitude in a time corresponding to a magnitude of the positional difference.

9. The display control device according to claim 1, wherein the first scrolling unit is configured to scroll the first contents list so that the positional difference decreases to a predetermined magnitude in a time corresponding to the number of contents existing between the first base-point-content position and the focus position.

10. The display control device according to claim 1, wherein the first scrolling unit is configured to scroll the first contents list so that the positional difference decreases to a predetermined magnitude in a time corresponding to a relationship between a time instant associated with the base-point content and a time instant associated with a content existing at the focus position.

11. The display control device according to claim 1, wherein the base-point-content identifying unit is configured to receive information which identifies the base-point content from another device to identify a base-point content identified by the information.

12. A display control method comprising:
a first-contents-list displaying step of displaying on a display screen a first contents list which is a scrollable list of contents;
a base-point-content identifying step of identifying a base-point content on the first contents list;
a base-point-content-position obtaining step of obtaining a first base-point-content position which is a position of the base-point content on the first contents list;
a focus position obtaining step of obtaining a focus position which is a position on the first contents list and is related to a predetermined region on the first contents list displayed on the display screen;
a positional difference calculating step of calculating a positional difference between the obtained first base-point-content position and the obtained focus position;
a first scrolling step of scrolling the first contents list displayed on the display screen so that the positional difference decreases; and
a second-contents-list displaying step of displaying in a region different from the first contents list on the display screen a second contents list which is a list of contents selected as candidates for the base-point content from the first contents list by a user; and
a tension displaying step of visualizing and displaying the magnitude of the tension on the display screen,
wherein the positional difference calculating step includes a tension calculating step configured to calculate, as the positional difference, a magnitude of physical tension virtually produced between a third base-point-content position and the first base-point-content position in association with a distance between the third base-point-content position and the first base-point-content position, the third base-point-content position being a position of a base-point-content identified on the second contents list and having a positional difference from the first base-point-content position which corresponds to a positional difference between the first base-point-content position and the focus position,
the first scrolling step scrolls the first contents list so that the tension decreases in accordance with a virtual restoring force of the tension, and
the tension displaying step represents and displays the tension as a virtual rubber cord or spring.

13. A non-transitory computer-readable storage medium having stored therein a program for causing a computer to execute steps included in the display control method according to claim 12.

14. An integrated circuit comprising:
a first-contents-list displaying unit configured to display on a display screen a first contents list which is a scrollable list of contents;
a base-point-content identifying unit configured to identify a base-point content on the first contents list;

a base-point-content-position obtaining unit configured to obtain a first base-point-content position which is a position of the base-point content on the first contents list;

a focus position obtaining unit configured to obtain a focus position which is a position on the first contents list and is related to a predetermined region on the first contents list displayed on the display screen;

a positional difference calculating unit configured to calculate a positional difference between the obtained first base-point-content position and the obtained focus position;

a first scrolling unit configured to scroll the first contents list displayed on the display screen so that the positional difference decreases;

a second-contents-list displaying unit configured to display in a region different from the first contents list on the display screen a second contents list which is a list of contents selected as candidates for the base-point content from the first contents list by a user; and a tension displaying unit configured to visualize and display the magnitude of the tension on the display screen, wherein the positional difference calculating unit includes a tension calculating unit configured to calculate, as the positional difference, a magnitude of physical tension virtually produced between a third base-point-content position and the first base-point-content position in association with a distance between the third base-point-content position and the first base-point-content position, the third base-point-content position being a position of a base-point-content identified on the second contents list and having a positional difference from the first base-point-content position which corresponds to a positional difference between the first base-point-content position and the focus position, the first scrolling unit is configured to scroll the first contents list so that the tension decreases in accordance with a virtual restoring force of the tension, and the tension displaying unit is configured to represent and display the tension as a virtual rubber cord or spring.

* * * * *